US011128405B2

(12) United States Patent
Phan et al.

(10) Patent No.: US 11,128,405 B2
(45) Date of Patent: Sep. 21, 2021

(54) SFN TIMING FOR FREQUENCY HOPPING SYSTEMS

(71) Applicant: TELEFONAKTIEBOLAGET LM ERICSSON (PUBL), Stockholm (SE)

(72) Inventors: Mai-Anh Phan, Herzogenrath (DE); David Sugirtharaj, Lund (SE); Emma Wittenmark, Lund (SE); Oskar Drugge, Hjärup (SE); Olof Liberg, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/048,970

(22) PCT Filed: Apr. 18, 2019

(86) PCT No.: PCT/IB2019/053244
§ 371 (c)(1),
(2) Date: Oct. 19, 2020

(87) PCT Pub. No.: WO2019/202555
PCT Pub. Date: Oct. 24, 2019

(65) Prior Publication Data
US 2021/0091891 A1 Mar. 25, 2021

Related U.S. Application Data

(60) Provisional application No. 62/659,575, filed on Apr. 18, 2018.

(51) Int. Cl.
*H04L 1/16* (2006.01)
*H04B 1/713* (2011.01)
*H04L 5/00* (2006.01)

(52) U.S. Cl.
CPC .......... *H04L 1/1642* (2013.01); *H04B 1/713* (2013.01); *H04L 5/0082* (2013.01)

(58) Field of Classification Search
CPC ...... H04L 1/1642; H04L 5/0082; H04B 1/713
See application file for complete search history.

(56) References Cited

U.S. PATENT DOCUMENTS

| 2015/0181575 A1* | 6/2015 | Ng ...................... H04W 72/042 370/329 |
| 2017/0202028 A1* | 7/2017 | Gaal ...................... H04W 4/70 |
| 2018/0020360 A1* | 1/2018 | Yerramalli ........ H04W 72/0453 |

(Continued)

FOREIGN PATENT DOCUMENTS

WO 2010087896 A1 8/2010

OTHER PUBLICATIONS

Panasonic, "RACH remaining issues", 3GPP TSG RAN WG1 Meeting #51, R1-074922, Nov. 5-9, 2007, Jeju, Korea.

*Primary Examiner* — Jae Y Lee
*Assistant Examiner* — Mohammed M Murshid

(57) ABSTRACT

According to an aspect, a wireless device identifies system frame numbers (SFNs) that are used for wireless transmissions that use a broadcast channel (BCH) transmission time interval (TTI), where frequency hopping cycles (FHCs) are not aligned with a cycle of the SFNs. The wireless device receives FH information indicating how the FHC used for wireless transmissions relates to the SFN cycle and identifies an SFN timing for the wireless transmissions based on the FH information.

23 Claims, 22 Drawing Sheets

(56) References Cited

U.S. PATENT DOCUMENTS

2018/0343676 A1* 11/2018 Yerramalli ............ H04W 74/08
2019/0007946 A1* 1/2019 Yerramalli ............ H04W 76/27
2019/0181995 A1* 6/2019 Liu .................. H04W 72/0446
2020/0328776 A1* 10/2020 Scholand ............... H04B 1/715
2020/0336973 A1* 10/2020 Niu .................. H04W 72/1289

* cited by examiner

| $T_{dwell}$ (ms) | FHC $T_0$ (s) | Wrap-around (s) | Wrap-around (FHCs) | # PBCH TTIs | # bits in MIB (with CSB) | # bits in MIB (without CSB) |
|---|---|---|---|---|---|---|
| 80 | 4 | 256 | 64 | 8 | 3 | 6 |
| 60 | 3 | 768 | 256 | 32 | 5 | 8 |
| 40 | 2 | 256 | 128 | 16 | 4 | 7 |

FIG. 3

| $N_{rep}^{PDSCH}$ | $N_{ID}^{Ncell}$ | Starting radio frame number for NB-SIB1 repetitions ($n_f$ mod 256) |
|---|---|---|
| 4 | $N_{ID}^{Ncell}$ mod 4 = 0 | 0 |
|  | $N_{ID}^{Ncell}$ mod 4 = 1 | 16 |
|  | $N_{ID}^{Ncell}$ mod 4 = 2 | 32 |
|  | $N_{ID}^{Ncell}$ mod 4 = 3 | 48 |
| 8 | $N_{ID}^{Ncell}$ mod 2 = 0 | 0 |
|  | $N_{ID}^{Ncell}$ mod 2 = 1 | 16 |
| 16 | $N_{ID}^{Ncell}$ mod 2 = 0 | 0 |
|  | $N_{ID}^{Ncell}$ mod 2 = 1 | 1 |

US 915 MHz band:

| Band | Frequency | Frequency channel |
|---|---|---|
| 47b | 865 – 868 MHz | 865.6 – 865.8 MHz<br>866.2 – 866.4 MHz<br>886.8 – 870.0 MHz<br>867.4 – 867.6 MHz |
| 54 | 869.4 – 869.65 MHz | 869.4 – 869.6 MHz |

| # bits | 3GPP MIB-NB | Comments for NB-IoT-U | # bits |
|---|---|---|---|
| 4 | The 4 MSBs of the System Frame Number, the 6 least significant bits of the SFN are acquired implicitly by decoding the NPBCH | a) The MSB(s) of the SFN ($N = 64$, $T_{dwell} = 40$ ms → $T_0 = 2.56$s); the remaining LSBs of the SFN are acquired by decoding the NPBCH b) $N = 50$, $T_{dwell} = 40$ ms: FHCN; the SFN is derived from the FHCN (signaling CSB version reduces by 3 bits) c) Reuse legacy | 2 or 7 (4) 4 |
| 2 | 2 LSBs of the hyper frame number; the remaining bits are present in *SIB1-NB* | Adopt from legacy [needed because modification period = 40.96 s] | 2 |
| 4 | SIB1-NB scheduling and size | Adopt from legacy | 4 |
| 5 | System information value tag | Adopt from legacy | 5 |
| 1 | Access class barring info | Adopt from legacy | 1 |
| 2+5 | Operation mode: Guard-band, In-band (same/diff PCI), Standalone | Not needed for NB-IoT-U | 0 |
| -- | -- | Simplified white list $T_{dwell} = 10$ ms: white list is carried in NSSS | 4 0 |
| 11 | spare bits for future extension | # spare bits that can be used for other signaling | 9..16 |
| 34 | | | 34 |

*FIG. 15*

SFN TIMING FOR FREQUENCY HOPPING SYSTEMS

PRIORITY CLAIM

The application is a national stage application of International Patent Application No. PCT/IB2019/053244, filed Apr. 18, 2019, which claims the benefit of and priority to U.S. Provisional Pat. App. 62/659,575 entitled "TIMING FOR NB-IOT-U" and filed on Apr. 18, 2018, the disclosures of which are hereby incorporated in their entirety.

TECHNICAL FIELD

The present disclosure generally relates to the field of wireless network communications, and more particularly, to identifying system frame numbers (SFNs) that are used for wireless transmissions that use a broadcast channel TTI, where frequency hopping cycles (FHCs) are not aligned with a cycle of the SFNs.

BACKGROUND

Long Term Evolution (LTE) radio frames consist of ten equally sized subframes 1 ms in length. Each frame is identified by its System Frame Number (SFN). The SFN is used to control different transmission cycles that may have a period longer than one frame, such as in the case of paging (discontinuous cycles). The SFN cycle supports $2^{10}=1024$ values corresponding to 10.24 seconds.

The 8 most significant bits (MSBs) of the SFN are signaled in the Master Information Block (MIB). The 2 least significant bits (LSBs) are derived by decoding the Physical Broadcast Channel (PBCH). The PBCH is transmitted with a transmit time interval (TTI) of 40 ms. Within the PBCH TTI, 4 different redundancy versions (RVs) of the PBCH are transmitted in subframe 0 (SF #0) of each radio frame. Thus, one radio frame within the PBCH TTI can be identified by the RV. In each radio frame, SF #0 and SF #5 contain a Secondary Synchronization Signal (SSS) and a Primary Synchronization Signal (PSS) of 1 OFDM symbol length for frequency division duplex (FDD), and in SF #0 and SF #4 for time division duplex (TDD).

Timing for LTE NB-IoT

For NB Internet-of-Things (NB-IoT), which was introduced for Rel-13 to support single Physical Resource Block (1-PRB) (180 kHz) systems, coverage was extended by increasing the TTIs and increasing the number of repetitions. This resulted in an increased PBCH TTI of 640 ms, which is divided into 8 blocks of 80 ms. Each block is identified by one of 8 Code subblock (CSB) versions, and in each block, the same CSB version is transmitted in SF #0 of each radio frame. Similarly, the NB PSS (NPSS) and SSS (NSSS) have been extended to 11 OFDM symbols, and thus occupies the data region of 1 subframe. NPSS is transmitted in SF #5 in each radio frame, and NSSS is transmitted in SF #9 of every radio frame with even an SFN. This is shown in FIG. 1.

With the 8 CSB versions, it is possible to identify a block within the NPBCH TTI. Each NPBCH subframe is self-decodable, but all the NPBCH subframes can also be jointly decoded. Within the 80 ms block, NPSS provides 10 ms timing, and NSSS uses 4 different phases, which gives the 80 ms timing information within the NPBCH block. As a consequence, 6 bits for SFN are derived from PBCH/NSSS/NPSS decoding (640 ms NPBCH TTI). The 4 MSBs of the SFN are transmitted in MIB-NB.

Due to the expansion in time, the 10-bit Hyper System Frame Number, also referred to as H-SFN or HFN, has been introduced to identify SFN cycle wrap-arounds.

Frequency Hopping for NB-IoT-U

For NB-IoT in unlicensed spectrum (NB-IoT-U), specified for MF1.1 for sub-1 GHz bands in the US/EU/China, NB-IoT-U has to comply with FCC regulations (15.247) for the US. There are basically 3 design options:

1. Digital Modulation (DM)

DM requires usage of 3 PRBs, which diverts from the original 1-PRB design.

2. Frequency Hopping Spread System (FHSS)

A FHSS requires the system to hop over at least N=50 frequencies if the bandwidth is <250 kHz. The system stays on each frequency for a specific time referred to as the dwell time ($T_{dwell}$). The dwell time is assumed to be a multiple of a radio frame. A frequency hopping cycle (FHC) implies that each of the N hopping frequencies is visited exactly once. Further, it is assumed that synchronization signals are transmitted on one or more known frequencies. These are referred to as anchor or discovery channels. To reduce the cell search complexity, the discovery channels are divided into primary and secondary discovery channels (P-Channel and S-Channel). For initial acquisition, the UE would only monitor the primary discovery channel, which only occurs every N frequency hops. Here, it is assumed that the P-Channel contains NPSS, NSSS, and NPBCH for one-shot acquisition.

3. Hybrid System

A hybrid system may assume DM for initial acquisition, and FH for data transmission/reception.

The dwell time on each frequency depends on the design, but mainly depends on the NPSS/NSSS synchronization performance and potentially NPBCH performance and whether to aim for one-shot or accumulated acquisition.

In order to minimize the cell acquisition delay for the FH variant, the minimum value for N, i.e., N=50 hopping frequencies/channels, is justified. However, for N=50 the primary discovery channel does not occur at fixed SFNs within an SFN cycle, but drifts in time. If N=64 frequency hops are used, the cell acquisition time is increased by a factor of 64/50=1.28, i.e., a 28% delay increase, assuming fixed time locations within the FHC (transmissions on the discovery channel always occur at the first hop of the FHC).

SUMMARY

With 64 hopping frequencies in a frequency hopping cycle (FHC), there is a simple alignment of FHCs to SFNs. However, a different number of hopping frequencies in an FHC may be required. In one example, there may be 50 hopping frequencies in an FHC. As a result, the FHCs (FHC period) and the SFN cycle (SFN period) will not be in alignment. Embodiments of the present invention enable a wireless device to derive an SFN timing using frequency hopping (FH) information, such as an FHC number (FHCN) or related indication, that is signaled by a network node. The SFN timing may be derived from a particular SFN in an SFN cycle. The SFNs are not limited to system frame numbers in the strict 3GPP sense, but the SFNs may include an internal system time or counter.

According to some embodiments, a method in a network node for identifying SFNs that are used for wireless transmissions that use a broadcast channel (BCH) transmission time interval (TTI), where FHCs are not aligned with a cycle of the SFNs, includes determining FH information indicating how the FHC used for wireless transmissions relates to the SFN cycle, such that a wireless device is able to use the FH information to identify an SFN timing for the wireless transmissions. The method also includes transmitting the FH information to a wireless device.

According to some embodiments, a method in a wireless device for SFNs that are used for wireless transmissions that use a BCH TTI, where FHCs are not aligned with a cycle of the SFNs, includes receiving FH information indicating how the FHC used for wireless transmissions relates to the SFN cycle and identifying an SFN timing for the wireless transmissions based on the FH information.

The FH information may indicate a relationship between the FHC used for transmissions and the SFN cycle, or what part of an SFN cycle the FHC is to be found. FIGS. 2A and 2B show examples with a number of BCH TTIs over 128 FHCs (256 seconds), where each BCH TTI is 8 FHCs, and where each FHC is given an FHC number (FHCN). Over the 256 seconds there are 25 SFN cycles. These example assume a dwell time of 40 ms on each hopping frequency, 50 hopping frequencies in an FHC, resulting in a duration of 50·0.04 s=2 s for each FHC, 1024 SFNs in an SFN cycle and a duration of 10 ms for each SFN (10.24 seconds for each SFN cycle). These assumptions are used for purposes of explanation and other dwell times, hopping frequencies, SFN cycle numbers, SFN durations, etc. may be used in other cases. In some cases, it is possible for an FHC to be longer in duration than an SFN cycle.

An FHC implies that each of the N hopping frequencies is visited exactly once. Under the assumption that N=50 hopping frequencies, identifying the FHC used may include, for example as shown in FIG. 2B, identifying that for the FHC with hops $t_{hop}$ #0-49, the FHCN is FHCN #0. Afterwards, for the FHC with hops $t_{hop}$ #50-99, the FHCN is FHCN #1, etc. This FHCN may be included in the FH information, in some embodiments. The FHCN may be used to point to or derive a relevant range of SFNs (which may also be a single SFN) in an SFN cycle, or more specifically, the FHCN may be used to derive a specific SFN and the corresponding SFN timing. For example, as shown in the example of FIG. 2B, FHCN #0 indicates that the relevant range is SFNs 0-199 in a first SFN cycle (referred to as HFN #0 in the example) and FHCN #1 indicates the range of SFNs 200-399. The SFN cycle is only 1024 SFNs so the SFN will wrap around such that FHCN #5 with $t_{hop}$ #250-299. The FHC is distributed over the two consecutive SFN cycles, HFN #0 and HFN #1, where $t_{hop}$ #250-299 correspond to SFN range 1000-1023 in HFN #0 and SFN 0-175 in HFN #1. FHCN #6 will indicate a range of SFNs 176-375, which is thus completely in the next SFN cycle (referred to as HFN #1). With the assumption that the discovery frequency is the first hop within the FHC, the first SFN of the SFN range can be derived from the anchor frequency transmission, and the wireless device can use an internal clock/counter for all remaining SFNs without further reading the FH information, provided that the clock keeps the time synchronization with the network.

In the example above, the duration of the FHC is smaller than the duration of an SFN cycle. If the SFN cycle is, for example, only indicated by 6 bits (i.e., each SFN cycle would consist of 128 SFNs corresponding to 1.28 seconds), the FHC having a duration of 2 seconds (with the same assumptions as above, i.e., the duration of the FHC>SFN cycle), a FHCN could point to a range distributed over multiple SFN cycles.

However, one main point is that the FHCN can typically be used to point to one specific SFN within a certain SFN cycle, and the remaining SFNs can be derived by the wireless device using its internal clock and counter as long as it is time synchronized to the network.

According to some embodiments, a network node configured for identifying SFNs that are used for wireless transmissions, where FHCs are not aligned with a cycle of the SFNs, includes communication or transceiver circuitry configured for communicating with wireless devices operating in a wireless communication network and processing circuitry operatively associated with the transceiver circuitry. The processing circuitry is configured to determine FH information indicating how the FHC used for wireless transmissions relates to the SFN cycle, such that a wireless device is able to use the FH information to identify an SFN timing for the wireless transmissions and transmit the FH information to a wireless device.

According to some embodiments, a wireless device configured for identifying SFNs that are used for wireless transmissions, where FHCs are not aligned with a cycle of the SFNs, comprises transceiver circuitry configured for communicating with network nodes in a wireless communication network and processing circuitry operatively associated with the transceiver circuitry. The processing circuitry is configured to receive FH information indicating how the FHC used for wireless transmissions relates to the SFN cycle and identify an SFN timing for the wireless transmissions based on the FH information.

When the wireless device is provided the FH information, it may derive the SFN timing with respect to the FHC using the FH information. The SFN timing may be used for various purposes, including locating FH positions for receiving signaling on channels.

The embodiments may be applicable to various systems, including Long Term Evolution (LTE), Wi-Fi, NB-IoT, etc. Some embodiments for NB-IoT are further described below. For example, an FHCN can be signaled in a MIB for NB IoT for unlicensed operation (MIB-NB-U). The number of bits required for signaling the FHCN in MIB-NB-U may depend on the dwell time. In order to further reduce the payload for MIB-NB-U, 8 CSB versions can be used to identify 8 different frequency hopping cycles. An NPBCH TTI may be extended to cover multiple frequency hopping cycles. With different CSB versions, in some embodiments, only the most significant bits (MSB) of the FHC will be transmitted in MIB-NB-U, and the different CSB versions can be easily soft-combined with the fixed value for the MSBs of the FHC in the MIB-NB-U.

According to some embodiments, methods, in a network node, for synchronizing SFNs of wireless transmissions that use a NPBCH TTI that is divided into a plurality of blocks, each block comprising a plurality of radio frames and carrying a CSB version that is transmitted in a first subframe of each radio frame as in NB-IoT or in several (e.g., consecutive) subframes within one or more radio frames as in NB-IoT-U, includes determining an FHCN identifying an FHC used when transmitting an NPBCH TTI, such that the FHCN may be used by a wireless device to identify SFNs for the NPBCH TTI. The method also includes transmitting the FHCN to a wireless device. In NB-IoT-U, a clustered approach has been adopted, i.e., the block carrying a CSB version is transmitted in all subframes of a certain radio frame.

According to some embodiments, methods, in a wireless device, for synchronizing SFNs of wireless transmissions that use an NPBCH TTI that is divided into a plurality of blocks, each block comprising a plurality of radio frames and carrying a CSB version that is transmitted in a first subframe of each radio frame as in NB-IoT or in several (e.g., consecutive) subframes within one or more radio frames as in NB-IoT-U, includes receiving an FHCN identifying an FHC used when transmitting a NPBCH TTI and identifying SFNs for the NPBCH TTI based on the FHCN.

Further aspects of the present invention are directed to an apparatus, network node, wireless device, computer program products or computer readable storage medium corresponding to the methods summarized above and functional implementations of the above-summarized apparatus and wireless device.

The FHCN may be transmitted in an MIB-NB for unlicensed operation (MIB-NB-U) and without any accompanying SFN identifier. With the FH cycle numbering scheme signaled in an MIB-NB-U, it is possible to use the minimum number of required hopping channels, such that the reoccurrence of the primary discovery channel can be minimized, resulting in a reduced cell acquisition time (e.g., by using only N=50 instead of N=64 frequency hops).

Of course, the present invention is not limited to the above features and advantages. Those of ordinary skill in the art will recognize additional features and advantages upon reading the following detailed description, and upon viewing the accompanying drawings.

BRIEF DESCRIPTION OF THE FIGURES

FIG. 3 illustrates different dwell times that will result in a different value range for the FHCN.

FIG. 15 illustrates bit assignment for an example MIB-NB for NB-IOT-U, according to some embodiments.

DETAILED DESCRIPTION OF EMBODIMENTS

Exemplary embodiments of the present disclosure will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment can be tacitly assumed to be present/used in another embodiment. The embodiments use a specific technology as an example, but can be equally applied to other technologies using a frequency hopping system, a time reference (here referred to as SFN), and system information broadcast (here referred to as MIB, MIB-NB or MIB-NB-U), on a broadcast channel (here referred to as BCH or NPBCH). The concept is not limited to narrowband transmissions (<250 kHz), but could also be applied to systems using other kind of bandwidths based on frequency hopping.

With 64 hopping frequencies, there is a simple alignment of FHCs to SFNs (e.g., in LTE). Assuming a dwell time ($T_{dwell}$) of 40 ms on each hopping frequency, the FHC starts every 2.56 seconds (64*0.04 s). This is 256 SFNs of the 1024 SFNs that are in a 10.24 second SFN cycle. That is, two or four sets of 64 hopping frequencies align nicely with an SFN cycle. In NB-IoT, 9 LSBs can be derived from decoding NPBCH and only the most significant bit (MSB) is to be signaled in the MIB-NB. For a 915 MHz band, 128 channels can be easily divided into 2 groups of 64 channels.

However, for latency or other efficiency reasons, a different number of hopping frequencies in an FHC may be required. In one example, there may be 50 hopping frequencies in an FHC, which is the FCC minimum required number of hopping frequencies for a frequency channel bandwidths <250 kHz. As a result, the FHCs and the SFN cycle will not be in alignment. The SFNs will wrap around (restart the 1024 SFN cycle) at an unexpected number of FHCs. The (primary) discovery channel does not occur at fixed SFNs within an SFN cycle, but drifts in time. For example, with 50 hopping frequencies, the FHC is shorter, with shorter latency (22%). Another benefit with a smaller number of hopping frequencies is the lower probability of overlapping channels between base stations (eNBs). With 50 hopping frequencies and $T_{dwell}$=40 ms, the FHC starts every 2 seconds (50*0.04 s) and there is a wrap-around after 25 H-SFNs (i.e., 256 s or 256/2=128 FHCs (7 bits)). Each FHC starts at different SFNs in different H-SFNs. This will randomize interference if eNBs are not SFN-aligned and an FH sequence repeats after each FHC. Otherwise, a longer FH sequence is needed.

Figure 1:
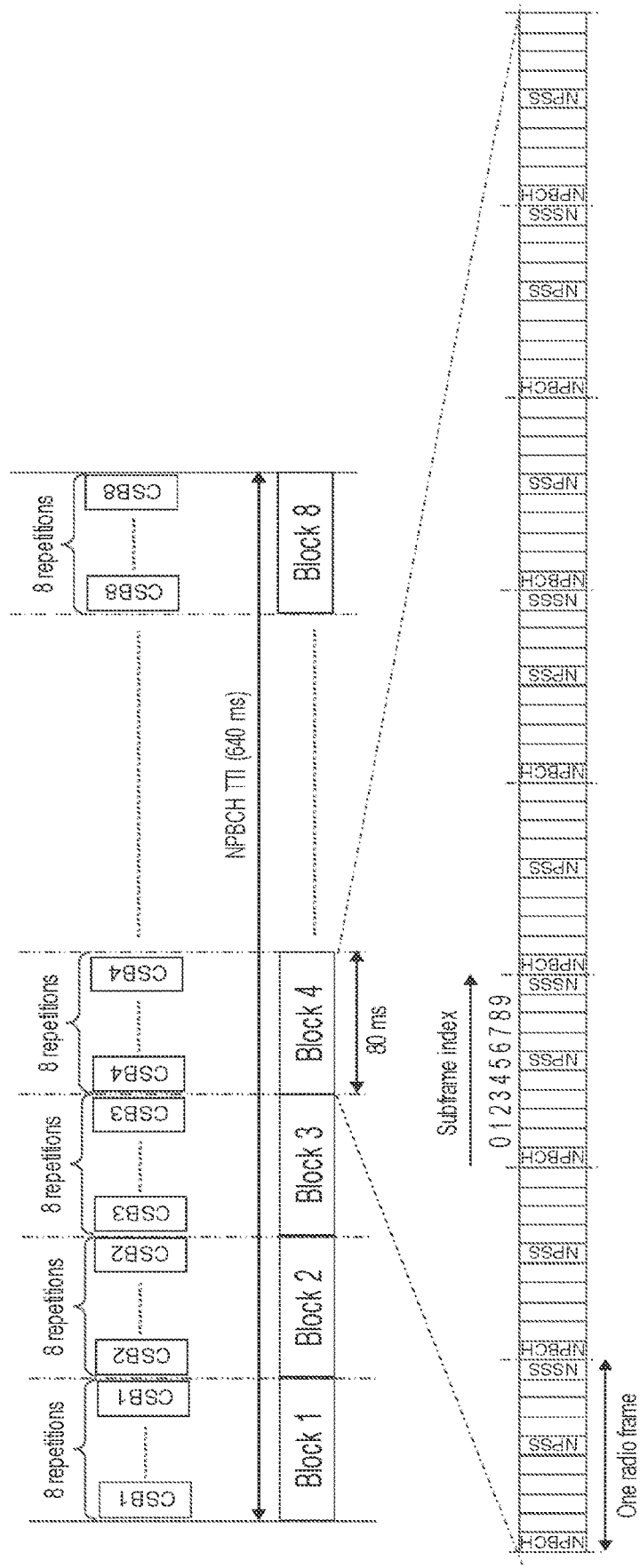
FIG. 1 illustrates an example NPBCH TTI used for NB-IoT.
Figure 2A:
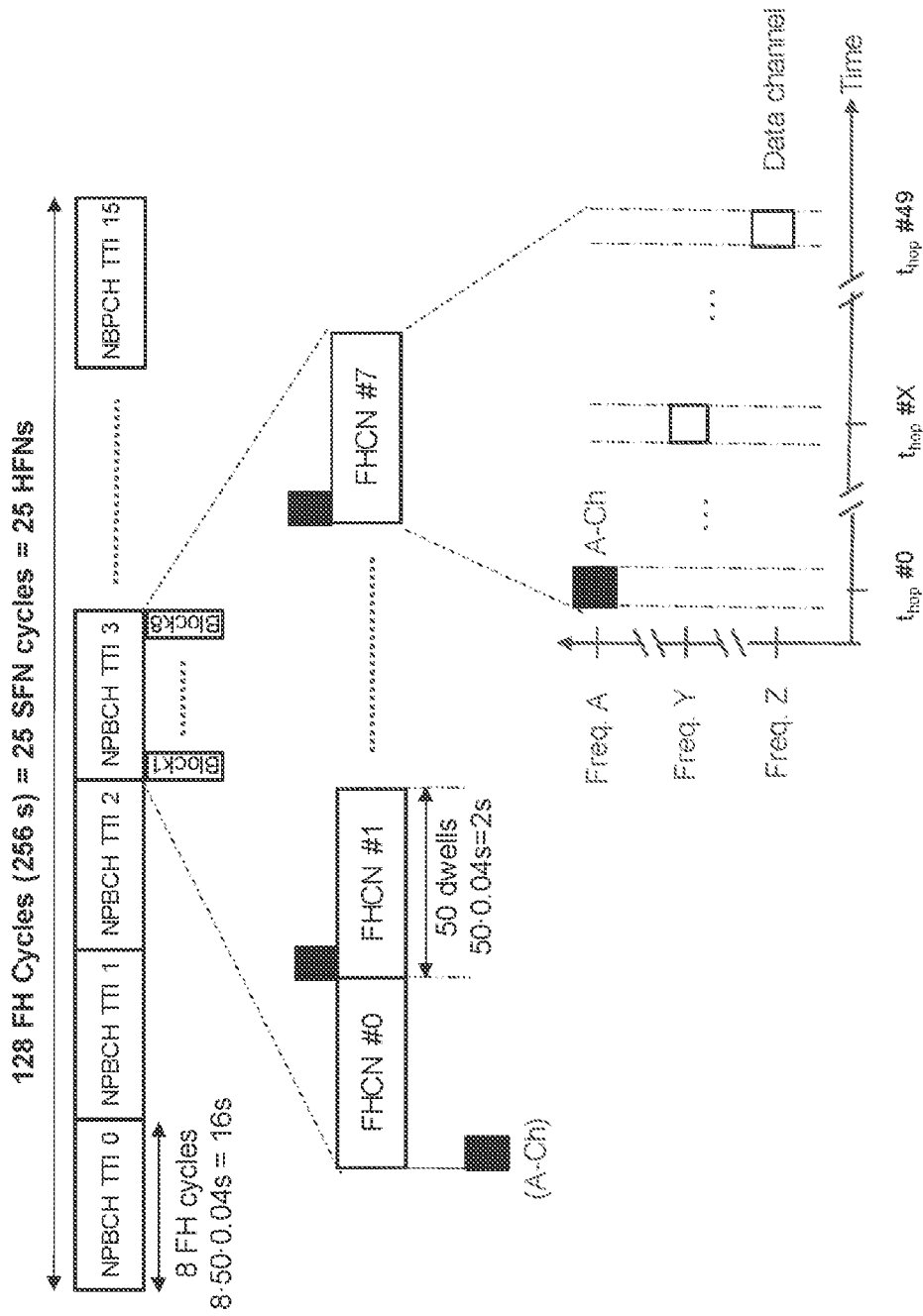
FIG. 2A illustrates an example of an FHCN identifying a frequency hopping cycle used when transmitting a NPBCH TTI, according to some embodiments.

According to some embodiments, a 7-bit FHC number (FHCN) may be used to indicate one of the 128 FHCs so that the wireless device can derive the SFN. For instance, the SFN may be derived knowing the FHCN, knowing that the FHC is 50 frequency hops and that the system stays on each frequency for a specific dwell time $T_{dwell}$ for a frequency hop of 4 radio frames, or 40 ms. Using this information with mod 1024 (example SFN cycle and specific to LTE), the SFN can be derived. In some cases, the CSB version may be used to distinguish 8 FHCs (one block of FHCs from another) and thus save 3 bits. This is shown in FIG. 2A.

In a more specific case of NB-IoT, for a dwell time $T_{dwell}$ of 40 ms, a discovery channel carrying NPSS/NSSS/PBCH and the number of hopping frequencies N=50 (not necessary that $N=2^X$), the wireless device can derive the SFN from the FHCN that needs to be signaled in MIB-NB instead of the SFN. NPBCH TTI may be extended from 640 ms to 8 FHCs=16 s. In each NPBCH TTI, there may be 8 different versions of NPBCH corresponding to the 8 different CSB versions from legacy NB-IoT are transmitted in the discovery dwells. In one FHC, the same NPBCH repetitions are used on the discovery dwells. Using the 8 CSB versions enables resolving time within an NBPCH TTI. Different CSB versions in each NPBCH TTI have the advantage that only 4 bits are needed to identify the 8 NPBCH TTIs within the 128 FHCs. One drawback is the higher complexity compared to legacy NB-IoT, because the CSBs are spread in time. It is observed that 8 CSB versions for NPBCH can be used to save 3 bits for signaling the 128 FHCs. The implicit signaling of the 3 least significant bits (LSB) of the FHC also has the benefit that the values do not change, such that the received bits on NBPCH can be soft-combined for better decoding performance in the UE.

FIG. 3 shows SFN timing for different dwell times. As shown by the fewer bits for a dwell time of 80 ms, less signaling is needed to derive SFN timing with a dwell time of 80 ms compared with lower dwell times. In order to minimize the cell acquisition delay for the FH variant, the minimum value for N may be 50 hopping frequencies/channels. However, for N=50 the primary discovery channel does not occur at fixed SFNs within different SFN cycles, but drifts in time. If N=64 frequency hops are used, the cell acquisition time is increased by a factor of 64/50=1.28, i.e., a 28% delay increase.

Figure 4:
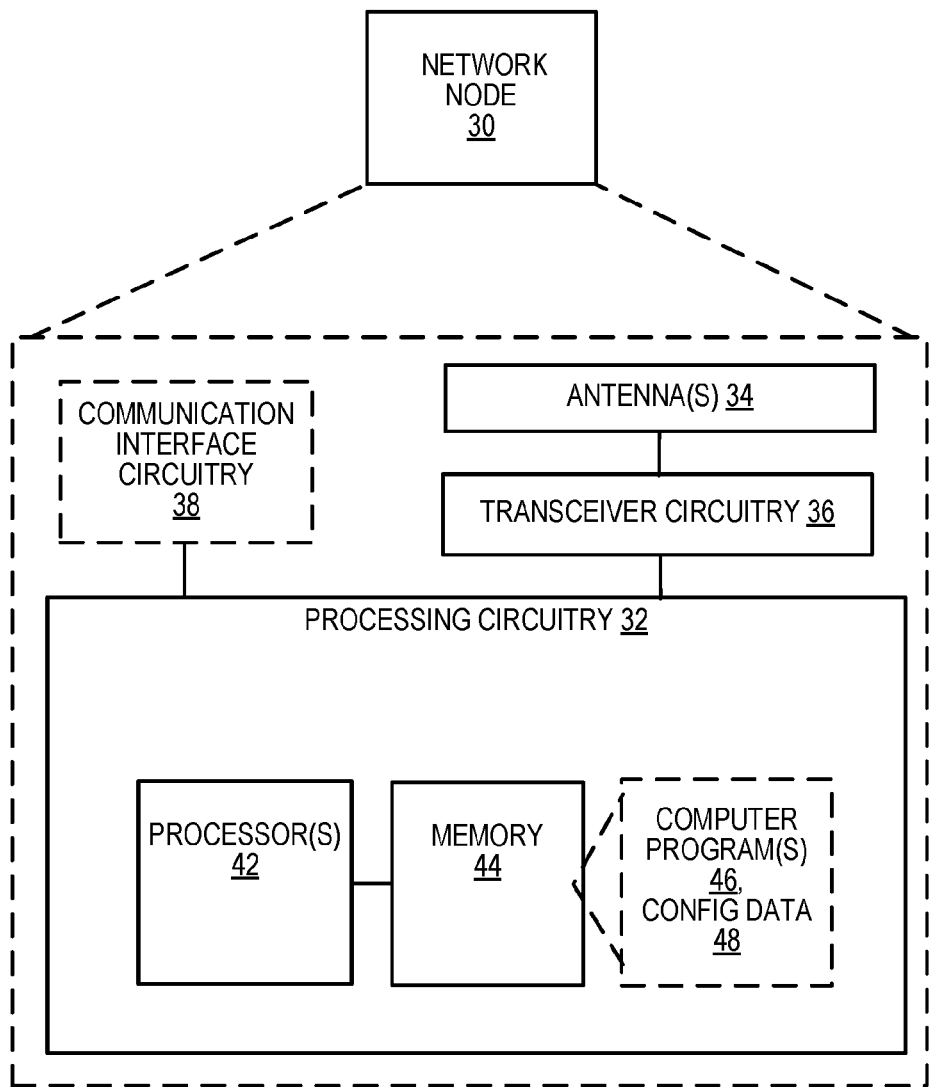
FIG. 4 illustrates a block diagram of a network node, according to some embodiments.

FIG. 4 shows a network node 30, also referred to as a "base station", which may be configured to carry out one or more of these disclosed techniques. The network node 30 may be an evolved Node B (eNodeB), Node B or gNB. While a network node 30 is shown in FIG. 4, the network node operations can be performed by other kinds of network access nodes or relay nodes. In the non-limiting embodiments described below, the network node 30 will be described as being configured to operate as a cellular network access node in an LTE network or NR network, but the embodiments are not limited to cellular technologies.

Those skilled in the art will readily appreciate how each type of node may be adapted to carry out one or more of the methods and signaling processes described herein, e.g., through the modification of and/or addition of appropriate program instructions for execution by processing circuitry 32.

Network node 30 facilitates communication between wireless terminals, other network access nodes and/or the core network. Network node 30 may include communication interface circuitry 38 that includes circuitry for communicating with other nodes in the core network, radio nodes, and/or other types of nodes in the network for the purposes of providing data and/or cellular communication services. Network node 30 communicates with wireless devices using antennas 34 and transceiver circuitry 36. Transceiver circuitry 36 may include transmitter circuits, receiver circuits, and associated control circuits that are collectively configured to transmit and receive signals according to a radio access technology, for the purposes of providing cellular communication services.

Network node 30 also includes one or more processing circuits 32 (or processing circuitry 32) that are operatively associated with transceiver circuitry 36 and, in some cases, communication interface circuitry 38. Processing circuitry 32 comprises one or more digital processors 42, e.g., one or more microprocessors, microcontrollers, Digital Signal Processors (DSPs), Field Programmable Gate Arrays (FPGAs), Complex Programmable Logic Devices (CPLDs), Application Specific Integrated Circuits (ASICs), or any mix thereof. More generally, processing circuitry 32 may comprise fixed circuitry, or programmable circuitry that is specially configured via the execution of program instructions implementing the functionality taught herein, or may comprise some mix of fixed and programmed circuitry. Processor 42 may be multi-core, i.e., having two or more processor cores utilized for enhanced performance, reduced power consumption, and more efficient simultaneous processing of multiple tasks.

Processing circuitry 32 also includes a memory 44. Memory 44, in some embodiments, stores one or more computer programs 46 and, optionally, configuration data 48. Memory 44 provides non-transitory storage for the computer program 46 and it may comprise one or more types of computer-readable media, such as disk storage, solid-state memory storage, or any mix thereof. Here, "non-transitory" means permanent, semi-permanent, or at least temporarily persistent storage and encompasses both long-term storage in non-volatile memory and storage in working memory, e.g., for program execution. By way of non-limiting example, memory 44 comprises any one or more of SRAM, DRAM, EEPROM, and FLASH memory, which may be in processing circuitry 32 and/or separate from processing circuitry 32. Memory 44 may also store any configuration data 48 used by network node 30. Processing circuitry 32 may be configured, e.g., through the use of appropriate program code stored in memory 44, to carry out one or more of the methods and/or signaling processes detailed hereinafter.

Processing circuitry 32 of network node 30 is configured, according to some embodiments, to enable a wireless device to identify SFNs that are used for wireless transmissions that use a broadcast channel (BCH) TTI, where FHCs are not aligned with a cycle of the SFNs. Processing circuitry 32 is configured to determine frequency hopping (FH) information indicating how the FHC used for wireless transmissions relates to the SFN cycle, such that a wireless device is able to use the FH information to identify an SFN timing for the wireless transmissions. Processing circuitry 32 is configured to transmit the FH information to a wireless device via transceiver circuitry 36.

Figure 2B:
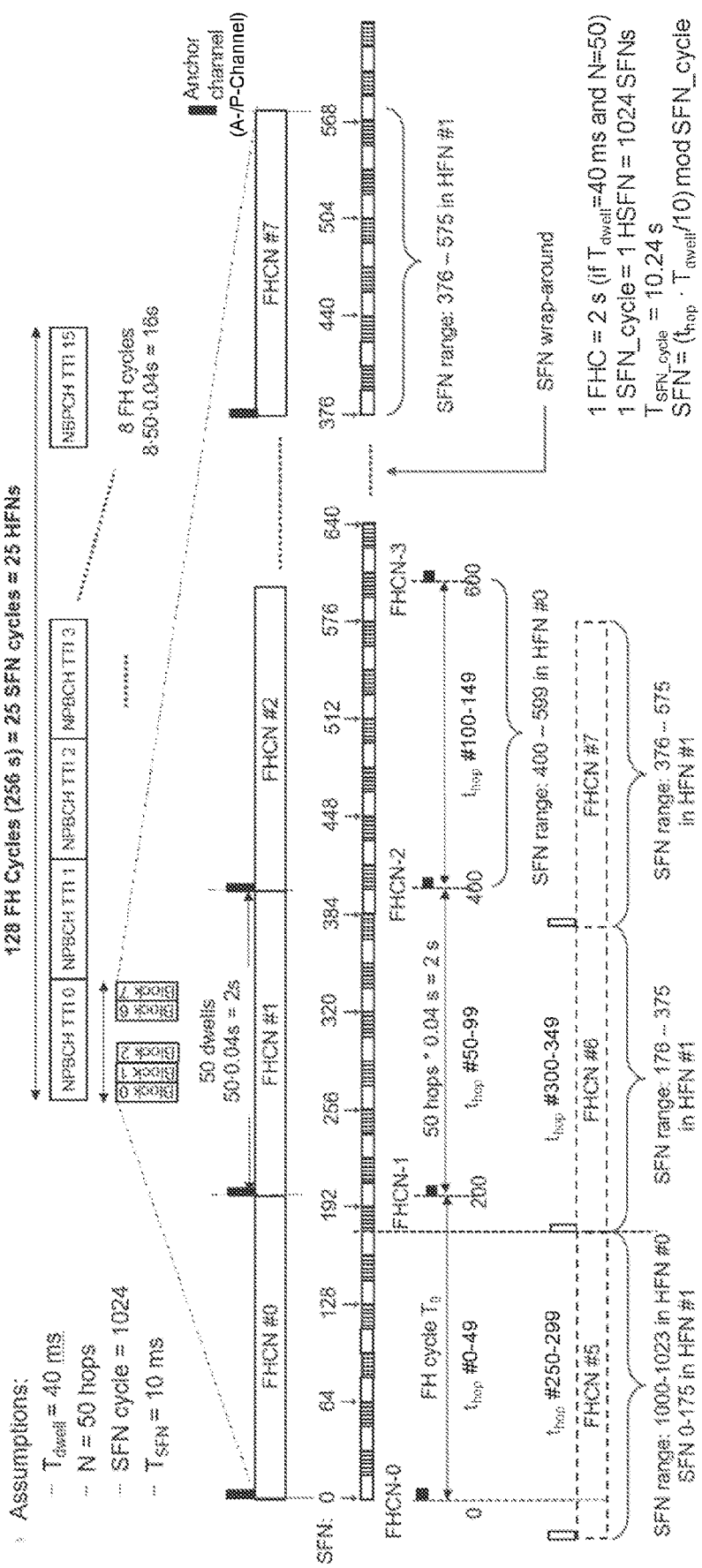
FIG. 2B illustrates an example of a relationship between FHCs and SFN cycles, according to some embodiments.

Processing circuitry 32 may be configured to determine the FH information by determining and transmitting an FHCN, identifying the FHC to be used, such that the FHCN may be used by the wireless device to identify the SFN timing. The FH information may also indicate the (absolute)

hop number count $t_{hop}$. The wireless device receiving the FHCN may then identify the FHC by, in an example where each FHC uses N=50 hopping frequencies, the SFN_cycle is 1024 and $T_{dwell}$ is 40 ms, identifying that FHCN #0 indicates hops $t_{hop}$ #0-49 correspond to SFNs 0-199 in a first SFN cycle (referred to as HFN #0), and that FHCN #1 indicates the next FHC (hops $t_{hop}$ #50-99) corresponds to SFNs 200-399 within the same SFN cycle (HFN #0). The SFN cycle is only 1024 SFNs so the SFN will wrap around. Thus, in FHCN #5 indicating $t_{hop}$ #250-299, the FHC is distributed over the two consecutive SFN cycles, HFN #0 and HFN #1, where $t_{hop}$ #250-299 correspond to SFN range 1000-1023 in HFN #0 and SFN 0-175 in HFN #1. As illustrated in FIG. 2B, the FHCN may be used to derive the SFN timing, which may include deriving a specific SFN.

Processing circuitry 32 of network node 30 is configured, according to other embodiments, to synchronize SFNs of wireless transmissions that may use a particular format, such as a NPBCH TTI that is divided into a plurality of blocks, each block comprising a plurality of radio frames and carrying a CSB version that is transmitted in a first subframe of each radio frame or multiple, potentially consecutive, subframes of a one or more radio frames. The processing circuitry 32 is configured to determine an FHCN identifying an FHC used when transmitting a NPBCH TTI, such that the FHCN may be used by a wireless device to identify SFNs for the NPBCH TTI. The processing circuitry 32 is also configured to transmit the FHCN to a wireless device.

Some assumptions for deriving NPBCH TTI durations and the number of bits to signal FHCN may include a dwell time, here $T_{dwell}$=40 ms, and a number of frequency hops (N or $N_{hops}$) N=50 hops for the FHC. Each FHC starts at different SFNs. This will randomize interference if eNBs are not SFN-aligned and a FH sequence repeats after each FHC. NPBCH TTI may be extended from 640 ms to 8 FH cycles=8·N·$T_{dwell}$=16 s. With the previous assumptions, the FHC starts every 2 s (=50·0.04 s) and wraps-around after 25 H-SFNs, i.e., 256 s or 256/2=128 FHCs (7 bits). In such a case, a 7-bit FHCN to indicate one of the 128 FHCs is sufficient to derive the SFN in which the FHC starts (for convenience, it is assumed that the primary discovery channel is transmitted at the beginning of the FHC, $T_{hop,anchor}$=0): SFN=(FHCN·50 hops·4 radio frames)mod 1024. This may be more generally: (FHCN·N hops·($T_{dwell}$/10) radio frames)mod SFN cycle. It is just that this example: SFN_cycle=1024 radio frames, $T_{dwell}$=40 ms, and N=50 hopping frequencies.

The CSB version may be used to distinguish 8 FHCs, which will not only save 3 bits, but will also allow more blocks to be soft-combined by keeping the MIB content unchanged. In each NPBCH TTI, there may be 8 different versions of NBPCH corresponding to the 8 different CSB versions from legacy NB-IoT are transmitted in the discovery dwells. In one FH cycle, the same NPBCH repetitions may be used on the discovery dwells. Using the 8 CSB versions enables resolving time within an NBPCH TTI.

Figure 5:
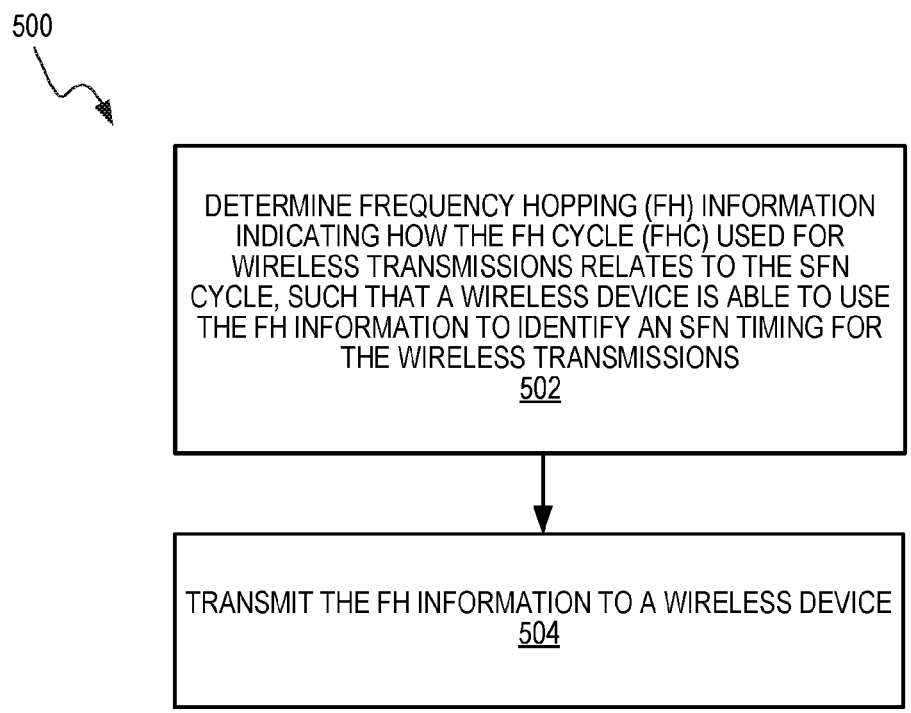
FIG. 5 illustrates a flow diagram of a method at the network node for identifying SFNs of wireless transmissions, according to some embodiments.

Processing circuitry 32 of network node 30 may also be configured to perform a method 500, shown in FIG. 5, for enabling a wireless device to identify SFNs that are used for wireless transmissions that use a BCH TTI, where FHCs are not aligned with a cycle of the SFNs. Method 500 includes determining FH information indicating how the FHC used for wireless transmissions relates to the SFN cycle, such that a wireless device is able to use the FH information to identify an SFN timing for the wireless transmissions (block 502) and transmitting the FH information to a wireless device (block 504). Determining the FH information may include determining an FHCN identifying the FHC to be used, such that the FHCN may be used by the wireless device to identify the SFN timing and to determine a specific frequency hop within the FHC.

The SFN timing may be used to determine a specific frequency hop within the FHC. The SFN timing may be identified or derived based on a number of frequency hops in the FHC, a dwell time on a hopping frequency and the number of SFNs in an SFN cycle. The SFN timing may be derived according to: SFN=($t_{hop}$·$T_{dwell}$/10)mod SFN_cycle, where $t_{hop}$=(FHCN·N), and where N is the number of hops in one FHC. The (absolute) hop number count $t_{hop}$ may be transmitted in the FH information as well. Transmitting the FH information to the wireless device may include transmitting the FHCN. The FHCN may be transmitted without any accompanying SFN identifier. The FHCN may be transmitted in a master information block (MIB), such as for NB Internet of Things for unlicensed operation (MIB-NB-U). The MIB may be transmitted in one dwell of the FHC.

Determining the FHCN may include: deriving the FHC pseudo-randomly from a physical cell identity (PCID) and/or a network identifier (NetID) associated with the network node; deriving the FHC from a white list for a FH set; or deriving the FHC from a bitmap that varies in group size. The number of bits used for signaling the FHC may depend on a duration of the FHC. The dwell time on each hopping frequency may be, for example, 20 ms, 40 ms, 60 ms or 80 ms. The channelization may use, for example, 200 kHz or 250 kHz.

The wireless transmissions may use a TTI, such as an NPBCH TTI, that is divided into a plurality of blocks, each block comprising a plurality of radio frames and carrying a CSB version that is transmitted in one or more subframes in one or more radio frames, where different CSB versions are used in successive blocks within the TTIs. The subframes may be multiple consecutive subframes. Method 500 may include determining the FH information based on the wireless device being able to use the CSB version to help identify a block, the SFN timing and/or the FHC for the TTI. The FH information may be transmitted with fewer bits than if the CSB version was not used, where the number of fewer bits is based on the total number of CSB versions. In an example, if there are $2^3$ or 8 CSB versions, 3 bits can be saved. In other words, if there are $2^X$ CSB versions, this means that X bits can be saved.

Figure 6:
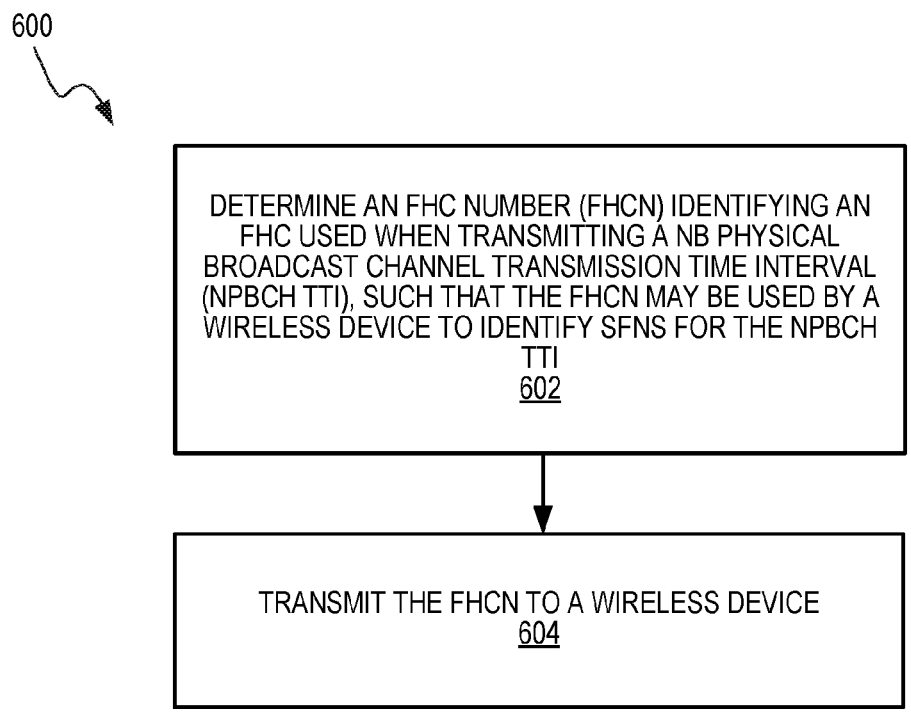
FIG. 6 illustrates a flow diagram of a method at the network node for synchronizing SFNs of wireless transmissions that use NPBCH TTI, according to some embodiments.

In another example, processing circuitry 32 of network node 30 may also be configured to perform a method 600 for synchronizing SFNs of wireless transmissions that use a NPBCH TTI, as shown in FIG. 6. Method 600 includes determining a FHCN identifying a frequency hopping cycle FHC used when transmitting a NPBCH TTI, such that the FHCN may be used by a wireless device to identify SFNs for the NPBCH TTI (block 602) and transmitting the FHCN to a wireless device (block 604).

The FHCN may identify the FHC. In one example, for $T_{dwell}$=40 ms, and a number of frequency hops (N or $N_{hops}$) N=50 hops for the FHC, the FHC starts every 2 s (=50·0.04 s) and wraps-around after 25 H-SFNs, i.e., 256 s or 256/2=128 FHCs (7 bits). For this example, the FHCN may be indicated with 7 bits. Different CSB versions may be used in successive blocks within the NPBCH TTIs. With $2^X$=$2^3$=8 CSB versions, the X=3 least significant bits, LSB (e.g., identifying a CSB version) may be used to identify an FHC within the NPBCH TTI, such that only the 4 most significant bits have to be explicitly signaled.

The FHCN may be transmitted without any accompanying SFN identifier. The FHCN may be transmitted in an MIB-NB-U. The MIB-NB-U may be acquired in one dwell of the FHC. In some embodiments, the number of bits used for signaling the FHCN depends on a duration of the FHC. In various embodiments, 200 kHz or 250 kHz may be used for channelization.

Figure 7:
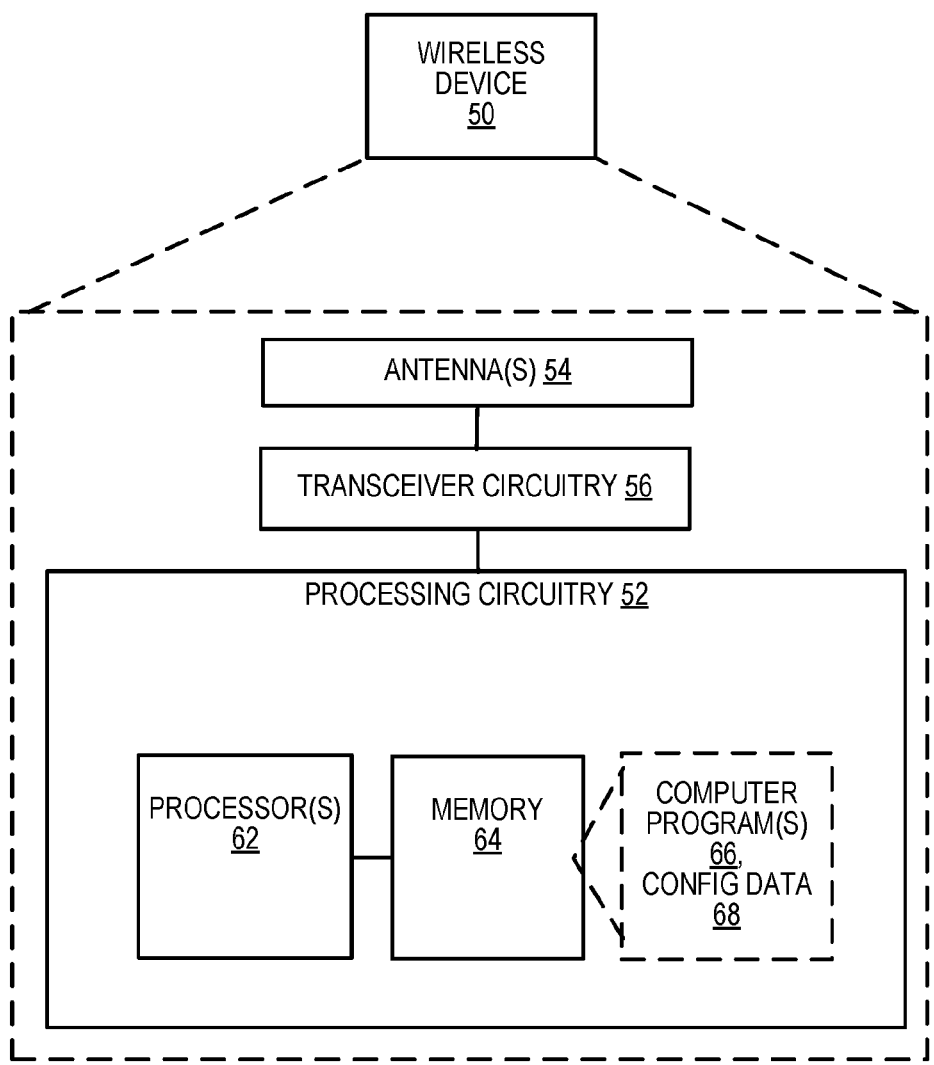
FIG. 7 illustrates a block diagram of a wireless device, according to some embodiments.

FIG. 7 illustrates a diagram of a wireless device 50 configured to carry out one or more of the disclosed techniques, according to some embodiments. Wireless device 50 may be considered to represent any wireless terminals that may operate in a network, such as a UE in a cellular network. Other examples may include a communication device, target device, device to device (D2D) UE, machine type UE or UE capable of machine to machine communication (M2M), a sensor equipped with UE, PDA (personal digital assistant), Tablet, mobile terminal, smart phone, laptop embedded equipped (LEE), laptop mounted equipment (LME), USB dongles, Customer Premises Equipment (CPE), etc.

Wireless device 50 is configured to communicate with a network node or base station in a wide-area cellular network via antennas 54 and transceiver circuitry 56. Transceiver circuitry 56 may include transmitter circuits, receiver circuits, and associated control circuits that are collectively configured to transmit and receive signals according to a radio access technology, for the purposes of using cellular communication services. This radio access technologies are NR and LTE for the purposes of this discussion.

Wireless device 50 also includes one or more processing circuits 52 (or processing circuitry 52) that are operatively associated with radio transceiver circuitry 56. Processing circuitry 52 comprises one or more digital processing circuits, e.g., one or more microprocessors, microcontrollers, DSPs, FPGAs, CPLDs, ASICs, or any mix thereof. More generally, processing circuitry 52 may comprise fixed circuitry, or programmable circuitry that is specially adapted via the execution of program instructions implementing the functionality taught herein, or may comprise some mix of fixed and programmed circuitry. Processing circuitry 52 may be multi-core.

Processing circuitry 52 also includes a memory 64. Memory 64, in some embodiments, stores one or more computer programs 66 and, optionally, configuration data 68. Memory 64 provides non-transitory storage for computer program 66 and it may comprise one or more types of computer-readable media, such as disk storage, solid-state memory storage, or any mix thereof. By way of non-limiting example, memory 64 comprises any one or more of SRAM, DRAM, EEPROM, and FLASH memory, which may be in processing circuitry 52 and/or separate from processing circuitry 52. Memory 64 may also store any configuration data 68 used by wireless device 50. Processing circuitry 52 may be configured, e.g., through the use of appropriate program code stored in memory 64, to carry out one or more of the methods and/or signaling processes detailed hereinafter.

Processing circuitry 52 of wireless device 50 is configured, according to some embodiments, to identify SFNs that are used for wireless transmissions that use a BCH TTI, where FHCs are not aligned with a cycle of the SFNs. Processing circuitry 52 is configured to receive FH information indicating how the FHC used for wireless transmissions relates to the SFN cycle and identify an SFN timing for the wireless transmissions based on the FH information. The SFN timing may be used to determine a specific frequency hop within the FHC.

Figure 8:
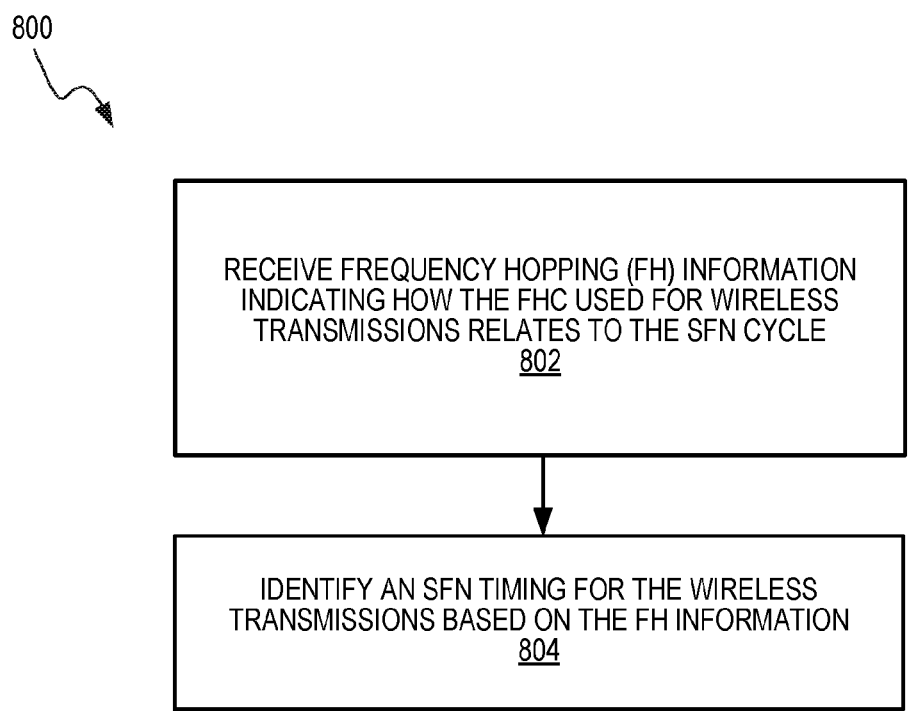
FIG. 8 illustrates a flow diagram of a method at the wireless device for identifying SFNs of wireless transmissions, according to some embodiments.

According to some embodiments, processing circuitry 52 is configured to perform a method 800, shown in FIG. 8, for identifying SFNs that are used for wireless transmissions that use a BCH TTI, where FHCs are not aligned with a cycle of the SFNs. Method 800 includes receiving FH information indicating how the FHC used for wireless transmissions relates to the SFN cycle (block 802) and identifying an SFN timing for the wireless transmissions based on the FH information (block 804).

Method 800 may include identifying the SFN timing based on the number of frequency hops in the FHC, a dwell time for each hopping frequency and the number of SFNs in the SFN cycle. Receiving the FH information may include receiving an FHCN identifying the FHC to be used. Receiving the FH information may also include receiving the (absolute) hop number count $t_{hop}$. The SFN timing is then based on the FHCN (with knowledge of the hop number count). The FHCN may be used to identify the FHC. The FHCN may be used to determine the relation between an FHC and an SFN cycle. For example, if each FHC uses N=50 hopping frequencies and SFN_cycle=1024, $T_{dwell}$=40 ms, FHCN #0 may indicate hops $t_{hop}$ #0-49 corresponding to SFNs 0-199 in a first SFN cycle (referred to as HFN #0), FHCN #1 may indicate the next FHC, or hops $t_{hop}$ #50-99 corresponding to SFNs 200-399 within the same SFN cycle (HFN #0). The SFN cycle is only 1024 SFNs so the SFN will wrap around. Thus, in FHCN #5 indicating $t_{hop}$ #250-299, the FHC is distributed over the two consecutive SFN cycles, HFN #0 and HFN #1, where #250-299 correspond to SFN range 1000-1023 in HFN #0 and SFN 0-175 in HFN #1. The SFN timing may be derived based on a number of frequency hops in the FHC denoted as "N" or equivalently "$N_{hops}$", a dwell time ($T_{dwell}$) for the FHC and the number of SFNs in the SFN cycle, denoted as SFN_cycle. If the FH information includes an FHCN, the SFN timing may be based on the FHCN. In one example, the SFN timing is identified according to: SFN=($t_{hop} \cdot T_{dwell}$/10)mod SFN_cycle, where $t_{hop}$= (FHCN·N) and where N=N_hops is the number of hops in the FHC.

In some embodiments, the wireless transmissions may use a particular type of format, such as an NPBCH TTI. The TTI may be divided into a plurality of blocks, each block comprising a plurality of radio frames and carrying a CSB version that is transmitted in a first subframe of each radio frame, specific subframes within a radio frame, or in one or more subframes (possibly consecutive) in one or more radio frames. Different CSB versions are used in successive blocks within the TTIs. The FHCN may then be indicated with, for example, 7 bits. Only 3 bits (e.g., identifying a CSB version) may be needed to identify an FHC within the NPBCH TTI, such that the FHCN comprises only 4 bits. Wireless device 50 uses the CSB to help identify a block, the SFN and/or the FHC for the TTI.

The dwell time of each hopping frequency may be something like 40 ms. The FHCN may be transmitted without any accompanying SFN identifier. The FHCN may be received in an MIB (e.g., MIB-NB-U). The MIB may be acquired in one dwell of the FHC, where the dwell is on the discovery or anchor channel. The FHCN may be determined by deriving the FHC pseudo-randomly from a PCID and/or a NetID associated with the network node.

Processing circuitry 52 of wireless device 50 is also configured, according to some embodiments, to synchronize SFNs of wireless transmissions that use a NPBCH TTI that is divided into a plurality of blocks, each block comprising a plurality of radio frames and carrying a CSB version that is transmitted in a first subframe of each radio frame. Processing circuitry 52 is configured to receive an FHCN identifying an FHC used when transmitting a NPBCH TTI and identify system frame numbers for the NPBCH TTI based on the FHCN.

Figure 9:
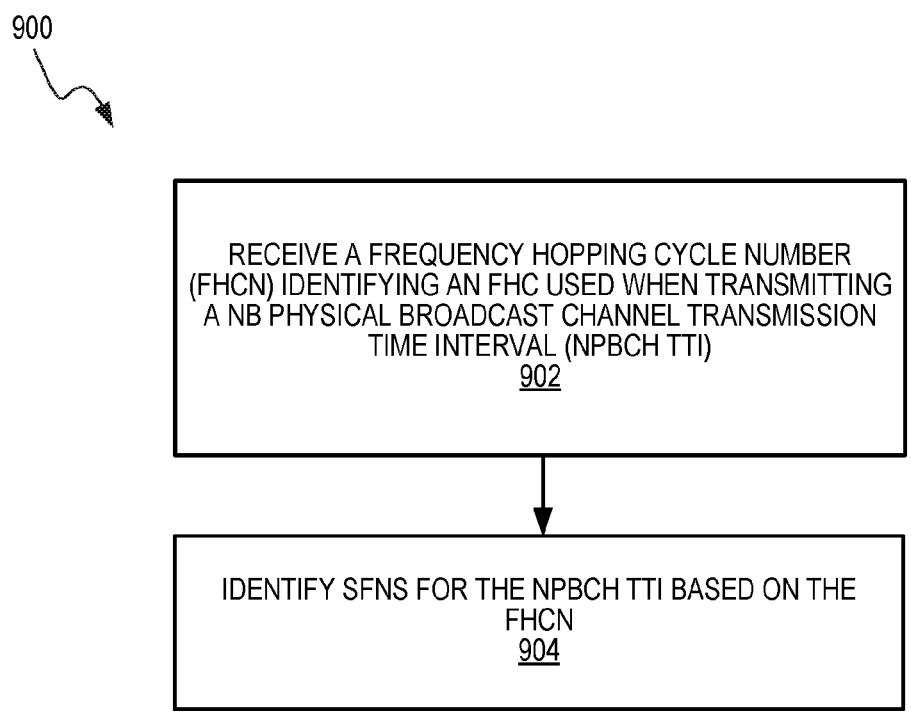
FIG. 9 illustrates a flow diagram of a method at the wireless device for synchronizing SFNs of wireless transmissions that use NPBCH TTI, according to some embodiments.

According to some embodiments, processing circuitry 52 is configured to perform a method 900 for synchronizing SFNs of wireless transmissions that use a NPBCH TTI, as shown in FIG. 9. Method 900 includes receiving an FHCN identifying an FHC used when transmitting a NPBCH TTI (block 902) and identifying system frame numbers for the NPBCH TTI based on the FHCN (block 904).

The FHCN may identify the FHC as having 50 hops. The FHCN may be indicated with 7 bits. Different CSB versions may be used in successive blocks within the NPBCH TTIs. 3 bits (e.g., identifying a CSB version) may be needed to identify an FHC within the NPBCH TTI, such that the FHCN comprises only 4 bits. The dwell time on each hopping frequency may be 40 milliseconds.

The FHCN may be transmitted and received without any accompanying SFN identifier. The FHCN may be received in an MIB-NB-U. The MIB-NB-U may be acquired in one dwell of the FHC. In some embodiments, the number of bits used for signaling the FHCN depends on a duration of the FHC.

According to various embodiments, the wireless device 50 and network node 30 may be configured to perform any of the techniques with additional considerations. In various embodiments, 200 kHz or 250 kHz may be used for channelization.

Figures 10A, 10B:
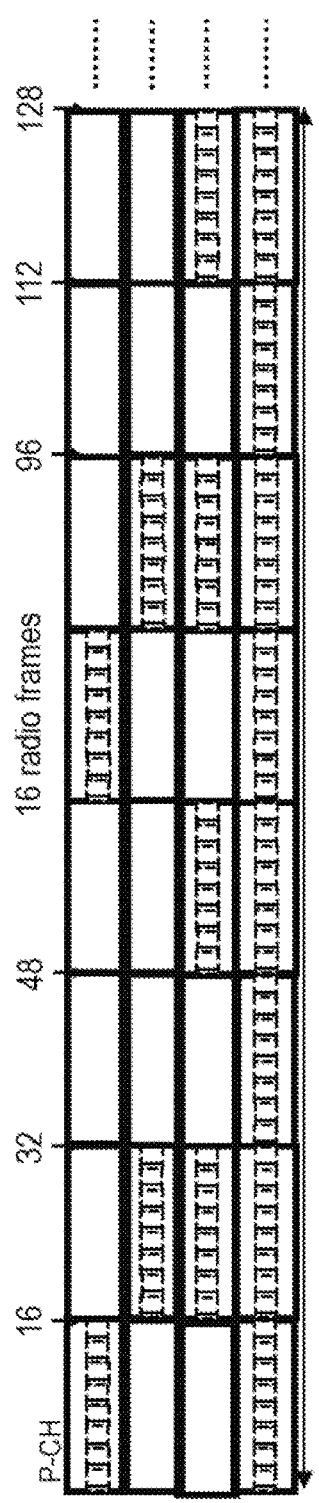
FIGS. 10A-10B illustrate SIB1-NB scheduling.
Figure 11:
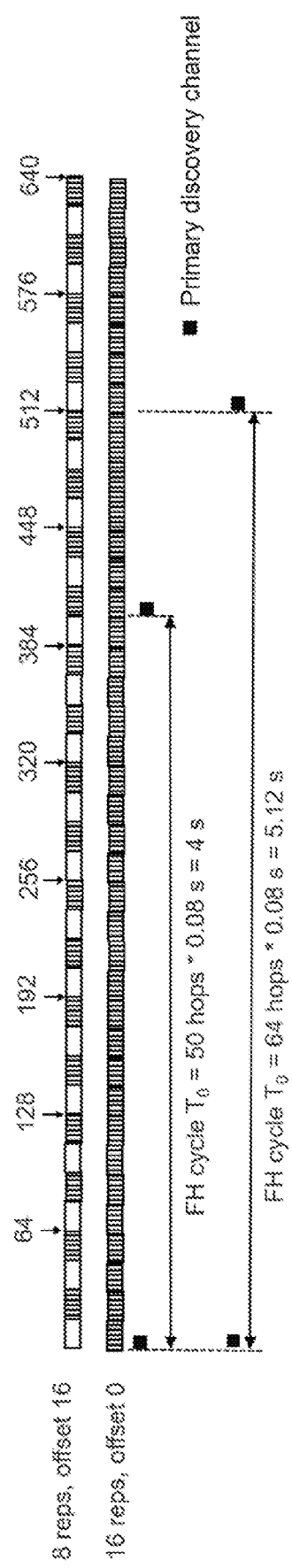
FIG. 11 illustrates frequency hopping cycles for primary discovery channels, according to some embodiments.

FIGS. 10A and 10B show a legacy fixed SIB1-NB scheduling in NB-IoT-U of 2560 ms with 12 configurations, according to some embodiments: 3 configurations for number of repetitions {4, 8, 10}; and 4 configurable transport block sizes {208, 328, 440 and 680}. A SIB1-NB transport block is carried in 8 SIB1-NB subframes and is mapped to subframe #4 in every other frame during 16 frames. These 16 frames are repeated 4, 8, or 16 times. The repetitions are evenly spread over the SIB1-NB transmission interval, which is defined as 256 frames, i.e., 2.56 seconds. The SIB1-NB transmission schedule may collide with the discovery channels. For $N_{rep}$=16, there will always be collisions as SIB1-NB would appear in each radio frame, as shown in FIG. 11. To address this, the UE may expect SIB1-NB transmissions only on data channels, according to some embodiments.

Figures 12A, 12B:
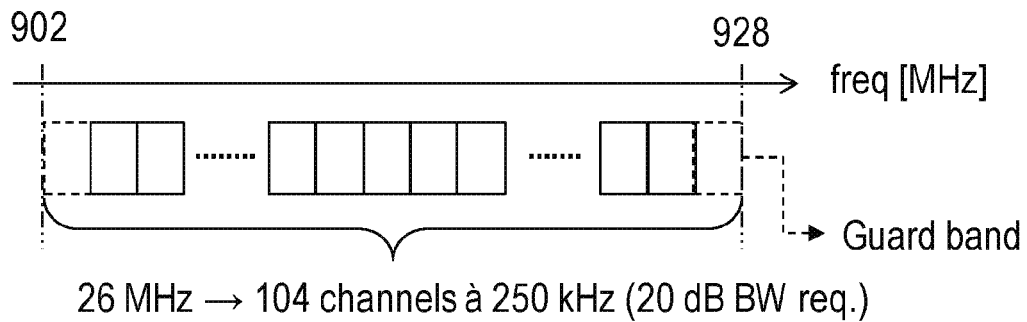
FIGS. 12A-12B illustrate channel separation for frequency bands.

Legacy NB-IoT standing alone may have a 200 kHz channel bandwidth as in GSM. With NB-IoT-U, frequency hopping systems may have channel carrier frequencies separated by a minimum of 25 kHz or the 20 dB bandwidth of the hopping channel, whichever is greater. Channel separation may be equal to or greater than 250 kHz. In the U.S., a 915 MHz ISM band (26 MHz) can be divided into 104 channels at 250 kHz. The outer frequencies can be used as guard bands. This is shown in FIG. 12A. The E.U. has band 47b that uses 200 kHz channels. This is shown in FIG. 12B. For frequency hopping systems operating in the 902-928 MHz band: if the 20 dB bandwidth of the hopping channel is less than 250 kHz, the system shall use at least 50 hopping frequencies and the average time of occupancy on any frequency shall not be greater than 0.4 seconds within a 20 second period. If the 20 dB bandwidth of the hopping channel is 250 kHz or greater, the system shall use at least 25 hopping frequencies.

Figure 13A:
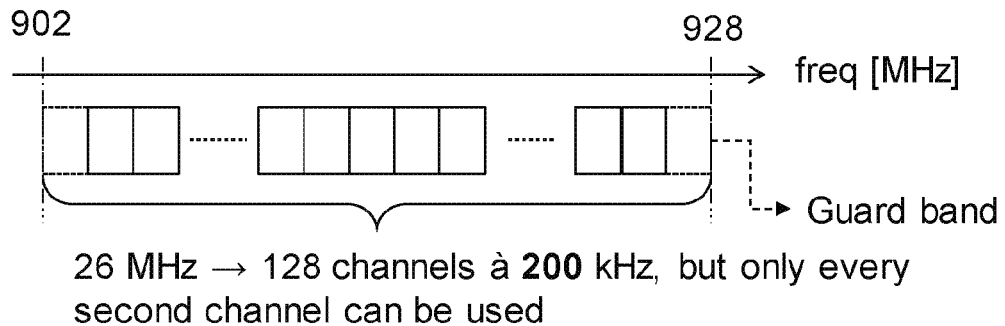
FIGS. 13A-13B illustrate white list for frequency bands.
Figure 13B:
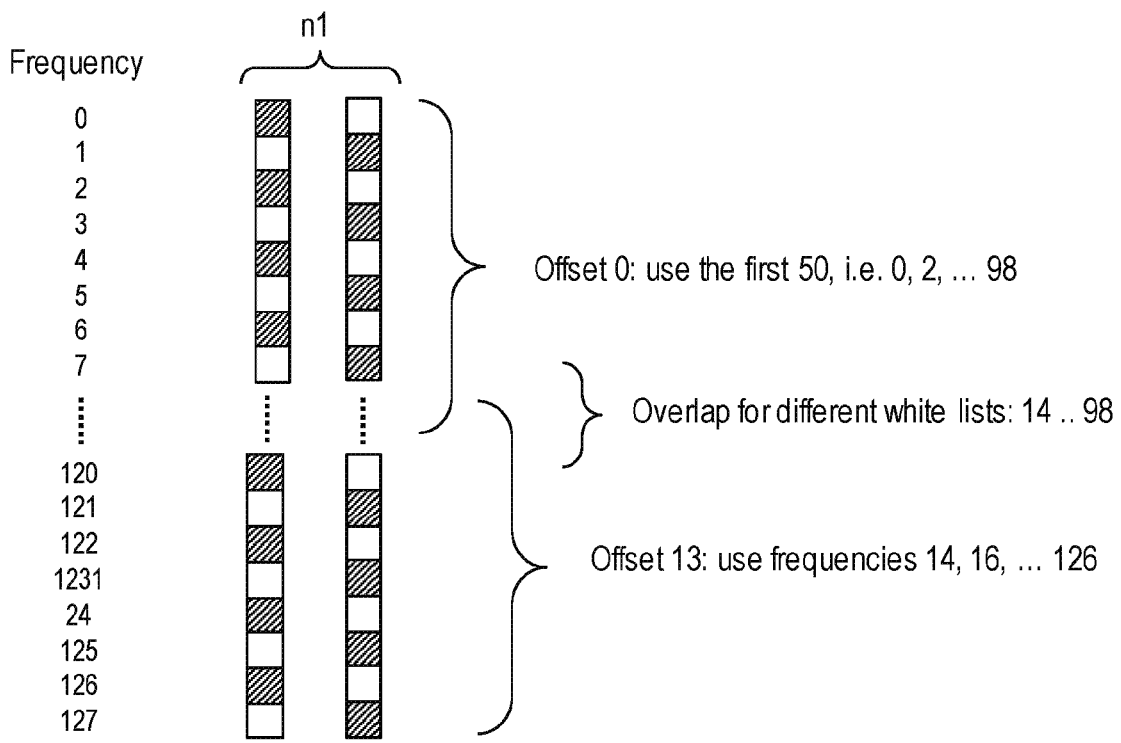

Selected channels can be whitelisted for the U.S. 915 MHz band, assuming N=50. FIG. 13A shows an example of whitelisted channel selection where the regular frequency occupation uses a 200 kHz channelization and only every second channel can be selected for the whitelist to fulfill the 20 dB bandwidth channel separation requirement (400 kHz channel separation for frequencies within the whitelist). There may be 1 bit to indicate even or odd frequencies. The offset may be 0 . . . 13, using 4 bits. This is shown by FIG. 13B. Accordingly, there may be 5 bits total to indicate a white listing. It is observed that the frequency channels are not optimally used and that there is a lot of overlap between the different whitelist configurations.

Figure 14A:
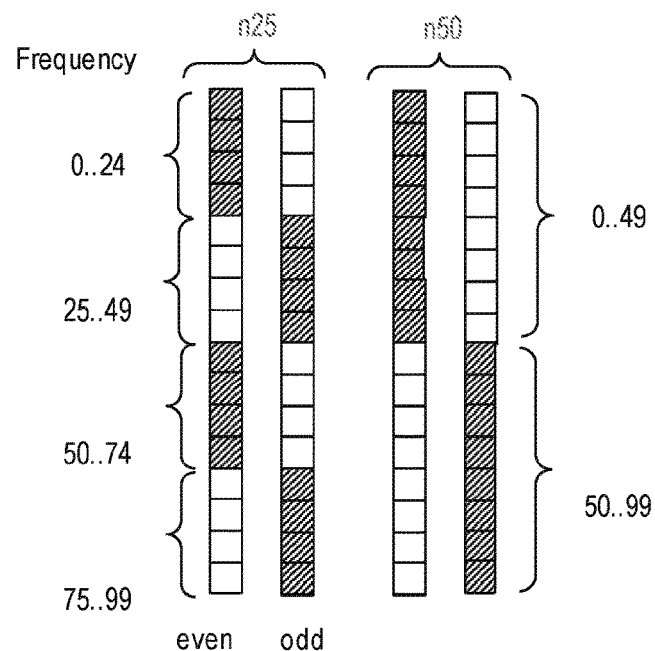
FIGS. 14A-14B also illustrate white lists for frequency bands.
Figure 14B:
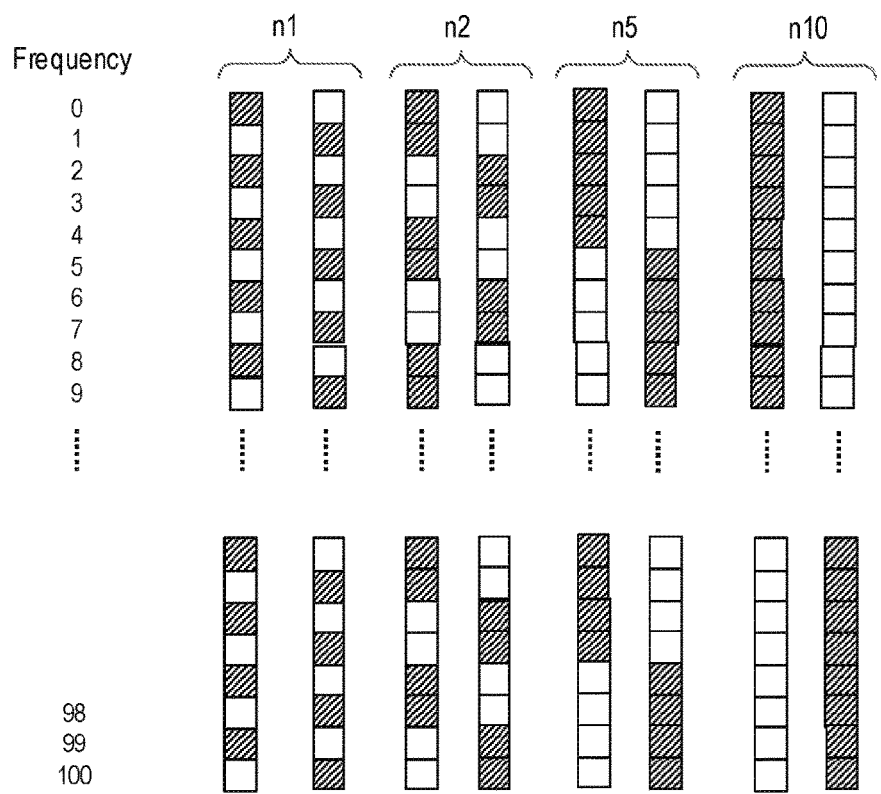

FIGS. 14A and 14B are used to show another example of whitelisted channel selection, but for regular frequency occupation of 250 kHz channelization. In some embodiments, 100 out of 102 channels are used for simplified grouping. The group size (3 bits) may be enumerated {n1, n2, n5, n10, n25, n50}. A small group size may have high interleaving and a large group size may have little interleaving. A group indication (1 bit) may indicate even or odd. There may be a total of 12 combinations, i.e., 4 bits to indicate a frequency list.

There may be 3 options for white listing for US 915 MHz band (N=50). As a first option, regular frequency occupation has, in the absence of other technologies, systematic patterns to simplify frequency selection. However, one drawback is very systematic frequency occupation.

A second option is pseudo random frequency selection for whitelisting (select N out of 102). An advantage is randomized interference. The selection is determined by, for example, PCID and NetID. PCID+NetID determines whitelisting. NetID may be more than 9 bits longs and may be determined from PLMN-identity (3-byte) stored in a SIM card. If the same PCID is used with a different NetID, there is a different whitelist.

For a third option, a bitmap is used. For a group size of 5 to 20, 20 bits are used. For a group size of 10, 10 bits are used. This provides for greater flexibility for eNB to choose frequencies, but frequency hopping over 50 channels will randomize interference. A drawback is that there is larger overhead. According to some embodiments, 250 kHz channelization will be used for frequency hopping in the U.S. In some embodiments, pre-defined whitelists (regular frequency occupation) will be used. The configuration may need to be signaled to the UE.

In some embodiments, $T_{dwell}$=10 ms, where discovery dwells carry 8 NPSS and 2 NPSS subframes. It may be assumed that 12 configurations are possible for the whitelist. In some cases, the whitelist may be indicated in the MIB-NB-U (4 bits). In other cases, the whitelist may be implicitly encoded in one of the 4 NSSS phase rotations (2 bits) and 2 bits are taken from the physical layer cell identity group (168 values), which is used to derive the PCID and is conveyed in the NSSS. This will involve 0 bits on MIB-NB-U (and no SIB-A and no SIB1). Up to 16 whitelist configurations can be included in the NSSS phase rotation, plus 4 bits stolen from the 504 PCIDs. With this change, there will be 126 PCIDs. That is, the PCID value range is reduced from 3*168=504 to 3*(168/4)=126 PCIDs, which is still higher than EC-GSM-IoT that uses 64 PCID values. The whitelist configuration may be implicitly determined by using the 4 NSSS phase rotations (2 bits) and by reducing the PCID value range by 2 bits. FH sequence may be derived from PCID, but not from SFN (as we assume a repeating FHC).

FIG. 15 illustrates the bit use of an MIB-NB for NB-IoT-U, according to some embodiments.

Figure 16:
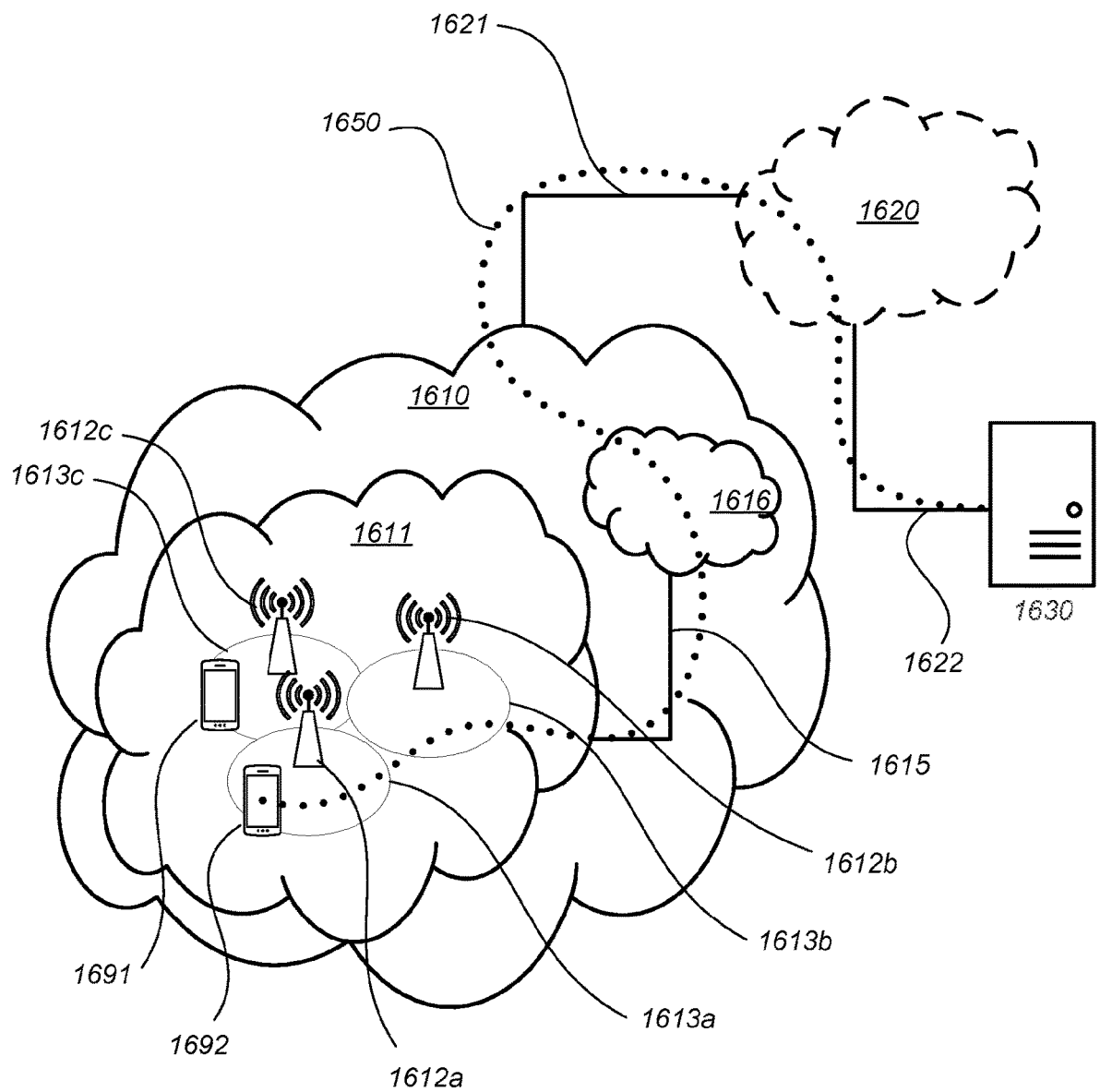
FIG. 16 schematically illustrates a telecommunication network connected via an intermediate network to a host computer, according to some embodiments.

FIG. 16, according to some embodiments, illustrates a communication system that includes a telecommunication network 1610, such as a 3GPP-type cellular network, which comprises an access network 1611, such as a radio access network, and a core network 1614. The access network 1611 comprises a plurality of base stations 1612a, 1612b, 1612c, such as NBs, eNBs, gNBs or other types of wireless access points, each defining a corresponding coverage area 1613a, 1613b, 1613c. Each base station 1612a, 1612b, 1612c is connectable to the core network 1614 over a wired or wireless connection 1615. A first UE 1691 located in coverage area 1613c is configured to wirelessly connect to, or be paged by, the corresponding base station 1612c. A second UE 1692 in coverage area 1613a is wirelessly connectable to the corresponding base station 1612a. While a plurality of UEs 1691, 1692 are illustrated in this example, the disclosed embodiments are equally applicable to a situation where a sole UE is in the coverage area or where a sole UE is connecting to the corresponding base station 1612.

The telecommunication network 1610 is itself connected to a host computer 1630, which may be embodied in the hardware and/or software of a standalone server, a cloud-implemented server, a distributed server or as processing resources in a server farm. The host computer 1630 may be under the ownership or control of a service provider, or may be operated by the service provider or on behalf of the service provider. The connections 1621, 1622 between the telecommunication network 1610 and the host computer 1630 may extend directly from the core network 1616 to the host computer 1630 or may go via an optional intermediate network 1620. The intermediate network 1620 may be one of, or a combination of more than one of, a public, private or hosted network; the intermediate network 1620, if any, may be a backbone network or the Internet; in particular, the intermediate network 1620 may comprise two or more sub-networks (not shown).

The communication system of FIG. 16 as a whole enables connectivity between one of the connected UEs 1691, 1692 and the host computer 1630. The connectivity may be described as an over-the-top (OTT) connection 1650. The host computer 1630 and the connected UEs 1691, 1692 are configured to communicate data and/or signaling via the OTT connection 1650, using the access network 1611, the core network 1614, any intermediate network 1620 and possible further infrastructure (not shown) as intermediaries. The OTT connection 1650 may be transparent in the sense that the participating communication devices through which the OTT connection 1650 passes are unaware of routing of uplink and downlink communications. For example, a base station 1612 may not or need not be informed about the past routing of an incoming downlink communication with data originating from a host computer 1630 to be forwarded (e.g., handed over) to a connected UE 1691. Similarly, the base station 1612 need not be aware of the future routing of an outgoing uplink communication originating from the UE 1691 towards the host computer 1630.

Example implementations, in accordance with an embodiment, of the UE, base station and host computer discussed in the preceding paragraphs will now be described with reference to FIG. 17. In a communication system 1700, a host computer 1710 comprises hardware 1715 including a communication interface 1716 configured to set up and maintain a wired or wireless connection with an interface of a different communication device of the communication system 1700. The host computer 1710 further comprises processing circuitry 1718, which may have storage and/or processing capabilities. In particular, the processing circuitry 1718 may comprise one or more programmable processors, application-specific integrated circuits, field programmable gate arrays or combinations of these (not shown) adapted to execute instructions. The host computer 1710 further comprises software 1711, which is stored in or accessible by the host computer 1710 and executable by the processing circuitry 1718. The software 1711 includes a host application 1712. The host application 1712 may be operable to provide a service to a remote user, such as a UE 1730 connecting via an OTT connection 1750 terminating at the UE 1730 and the host computer 1710. In providing the service to the remote user, the host application 1712 may provide user data which is transmitted using the OTT connection 1750.

The communication system 1700 further includes a base station 1720 provided in a telecommunication system and comprising hardware 1725 enabling it to communicate with the host computer 1710 and with the UE 1730. The hardware 1725 may include a communication interface 1726 for setting up and maintaining a wired or wireless connection with an interface of a different communication device of the communication system 1700, as well as a radio interface 1727 for setting up and maintaining at least a wireless connection 1770 with a UE 1730 located in a coverage area (not shown in FIG. 17) served by the base station 1720. The communication interface 1726 may be configured to facilitate a connection 1760 to the host computer 1710. The connection 1760 may be direct or it may pass through a core network (not shown in FIG. 17) of the telecommunication system and/or through one or more intermediate networks outside the telecommunication system. In the embodiment shown, the hardware 1725 of the base station 1720 further includes processing circuitry 1728, which may comprise one or more programmable processors, application-specific integrated circuits, field programmable gate arrays or combinations of these (not shown) adapted to execute instructions. The base station 1720 further has software 1721 stored internally or accessible via an external connection.

The communication system 1700 further includes the UE 1730 already referred to. Its hardware 1735 may include a radio interface 1737 configured to set up and maintain a wireless connection 1770 with a base station serving a coverage area in which the UE 1730 is currently located. The hardware 1735 of the UE 1730 further includes processing circuitry 1738, which may comprise one or more programmable processors, application-specific integrated circuits, field programmable gate arrays or combinations of these (not shown) adapted to execute instructions. The UE 1730 further comprises software 1731, which is stored in or accessible by the UE 1730 and executable by the processing circuitry 1738. The software 1731 includes a client application 1732. The client application 1732 may be operable to provide a service to a human or non-human user via the UE 1730, with the support of the host computer 1710. In the host computer 1710, an executing host application 1712 may communicate with the executing client application 1732 via the OTT connection 1750 terminating at the UE 1730 and the host computer 1710. In providing the service to the user, the client application 1732 may receive request data from the host application 1712 and provide user data in response to the request data. The OTT connection 1750 may transfer both the request data and the user data. The client application 1732 may interact with the user to generate the user data that it provides.

Figure 17:
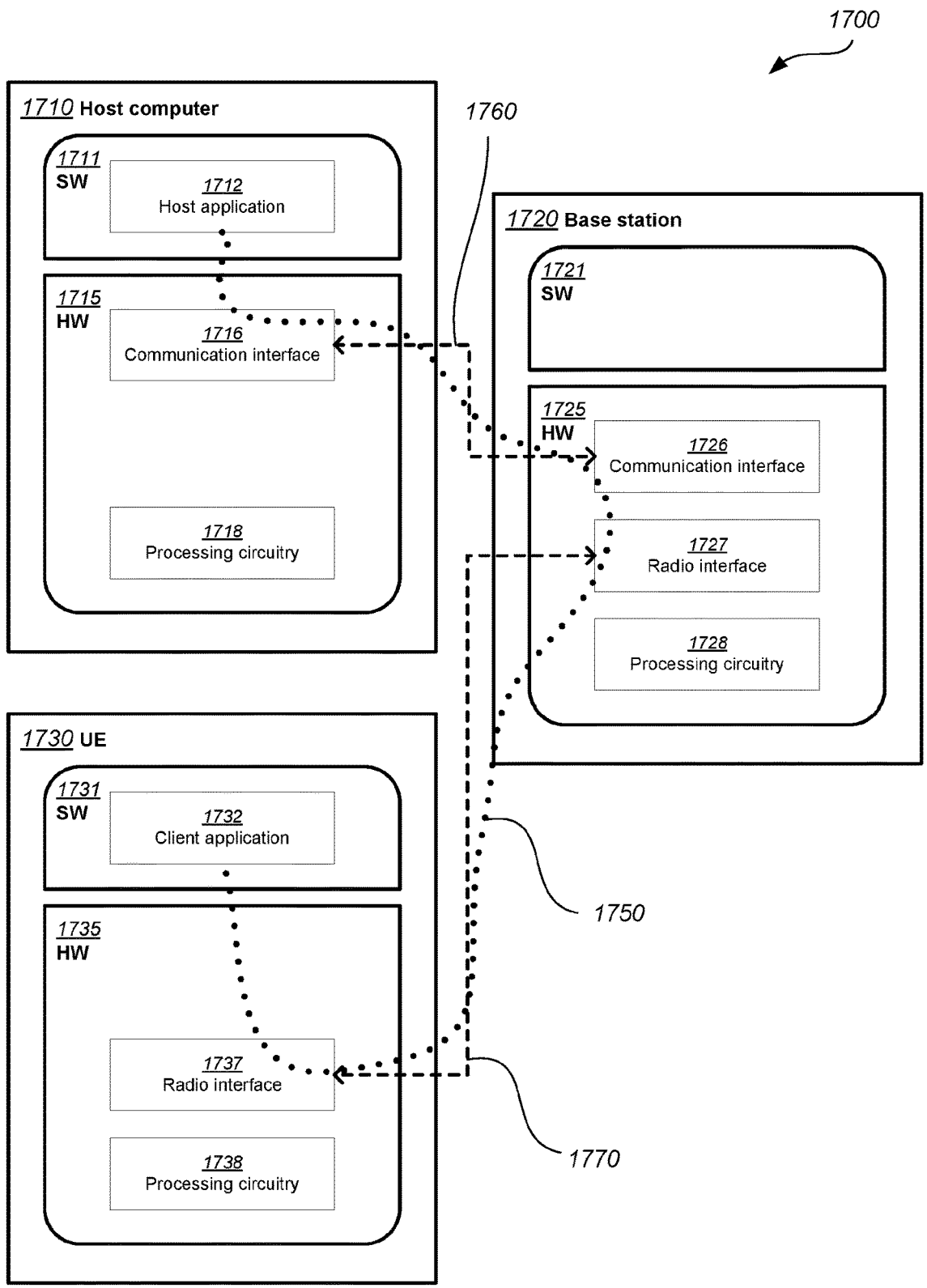
FIG. 17 is a generalized block diagram of a host computer communicating via a base station with a user equipment over a partially wireless connection, according to some embodiments.

It is noted that the host computer 1710, base station 1720 and UE 1730 illustrated in FIG. 17 may be identical to the host computer 1630, one of the base stations 1612a, 1612b, 1612c and one of the UEs 1691, 1692 of FIG. 16, respectively. This is to say, the inner workings of these entities may be as shown in FIG. 17 and independently, the surrounding network topology may be that of FIG. 16.

In FIG. 17, the OTT connection 1750 has been drawn abstractly to illustrate the communication between the host computer 1710 and the user equipment 1730 via the base station 1720, without explicit reference to any intermediary devices and the precise routing of messages via these devices. Network infrastructure may determine the routing, which it may be configured to hide from the UE 1730 or from the service provider operating the host computer 1710, or both. While the OTT connection 1750 is active, the network infrastructure may further take decisions by which it dynamically changes the routing (e.g., on the basis of load balancing consideration or reconfiguration of the network).

The wireless connection 1770 between the UE 1730 and the base station 1720 is in accordance with the teachings of the embodiments described throughout this disclosure, such as provided by nodes such as wireless device 50 and network node 30, along with the corresponding methods 500, 600, 800 and 900. The various embodiments described that FH information, such as an FHCN, may be transmitted so that a wireless device can derive an SFN timing in cases where the FHCs and the SFN cycle are not aligned. This makes it possible to use a minimum number of required hopping channels (e.g., 50), such that the reoccurrence of the primary discovery channel can be minimized, resulting in a reduced cell acquisition time.

More precisely, the teachings of these embodiments may improve the data rate, capacity, latency and/or power consumption for the network and UE 1730 using the OTT connection 1750 and thereby provide benefits such as reduced user waiting time, more capacity, better responsiveness, and better device battery time.

A measurement procedure may be provided for the purpose of monitoring data rate, latency and other factors on which the one or more embodiments improve. There may further be an optional network functionality for reconfiguring the OTT connection 1750 between the host computer 1710 and UE 1730, in response to variations in the measurement results. The measurement procedure and/or the network functionality for reconfiguring the OTT connection 1750 may be implemented in the software 1711 of the host computer 1710 or in the software 1731 of the UE 1730, or both. In embodiments, sensors (not shown) may be deployed in or in association with communication devices through which the OTT connection 1750 passes; the sensors may participate in the measurement procedure by supplying values of the monitored quantities exemplified above, or supplying values of other physical quantities from which software 1711, 1731 may compute or estimate the monitored quantities. The reconfiguring of the OTT connection 1750 may include message format, retransmission settings, preferred routing etc.; the reconfiguring need not affect the base station 1720, and it may be unknown or imperceptible to the base station 1720. Such procedures and functionalities may be known and practiced in the art. In certain embodiments, measurements may involve proprietary UE signaling facilitating the host computer's 1710 measurements of throughput, propagation times, latency and the like. The measurements may be implemented in that the software 1711, 1731 causes messages to be transmitted, in particular empty or 'dummy' messages, using the OTT connection 1750 while it monitors propagation times, errors etc.

Figure 18:
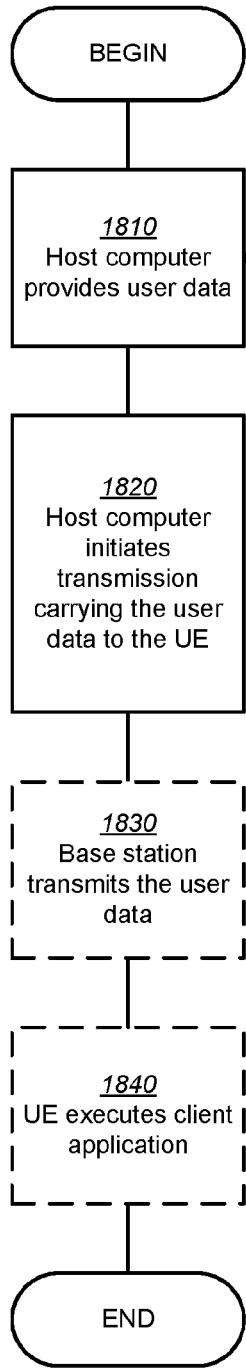
FIGS. 18 to 19 are flowcharts illustrating example methods implemented in a communication system including a host computer, a base station and a user equipment.

FIG. 18 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 18 will be included in this section. In a first step 1810 of the method, the host computer provides user data. In an optional substep 1811 of the first step 1810, the host computer provides the user data by executing a host application. In a second step 1820, the host computer initiates a transmission carrying the user data to the UE. In an optional third step 1830, the base station transmits to the UE the user data which was carried in the transmission that the host computer initiated, in accordance with the teachings of the embodiments described throughout this disclosure. In an optional fourth step 1840, the UE executes a client application associated with the host application executed by the host computer.

Figure 19:
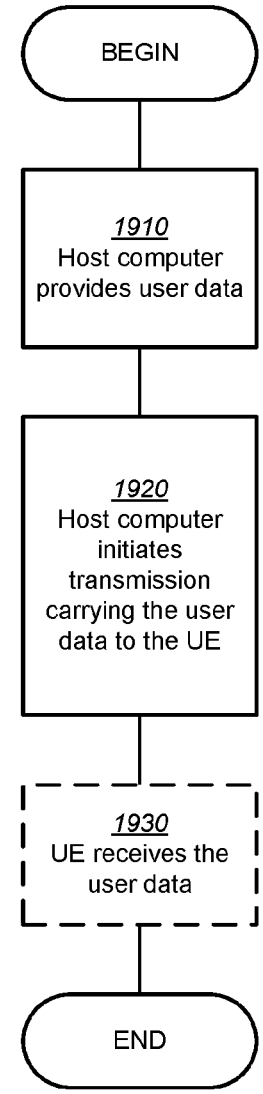

FIG. 19 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 19 will be included in this section. In a first step 1910 of the method, the host computer provides user data. In an optional substep (not shown) the host computer provides the user data by executing a host application. In a second step 1920, the host computer initiates a transmission carrying the user data to the UE. The transmission may pass via the base station, in accordance with the teachings of the embodiments described throughout this disclosure. In an optional third step 1930, the UE receives the user data carried in the transmission.

Figures 20, 21:
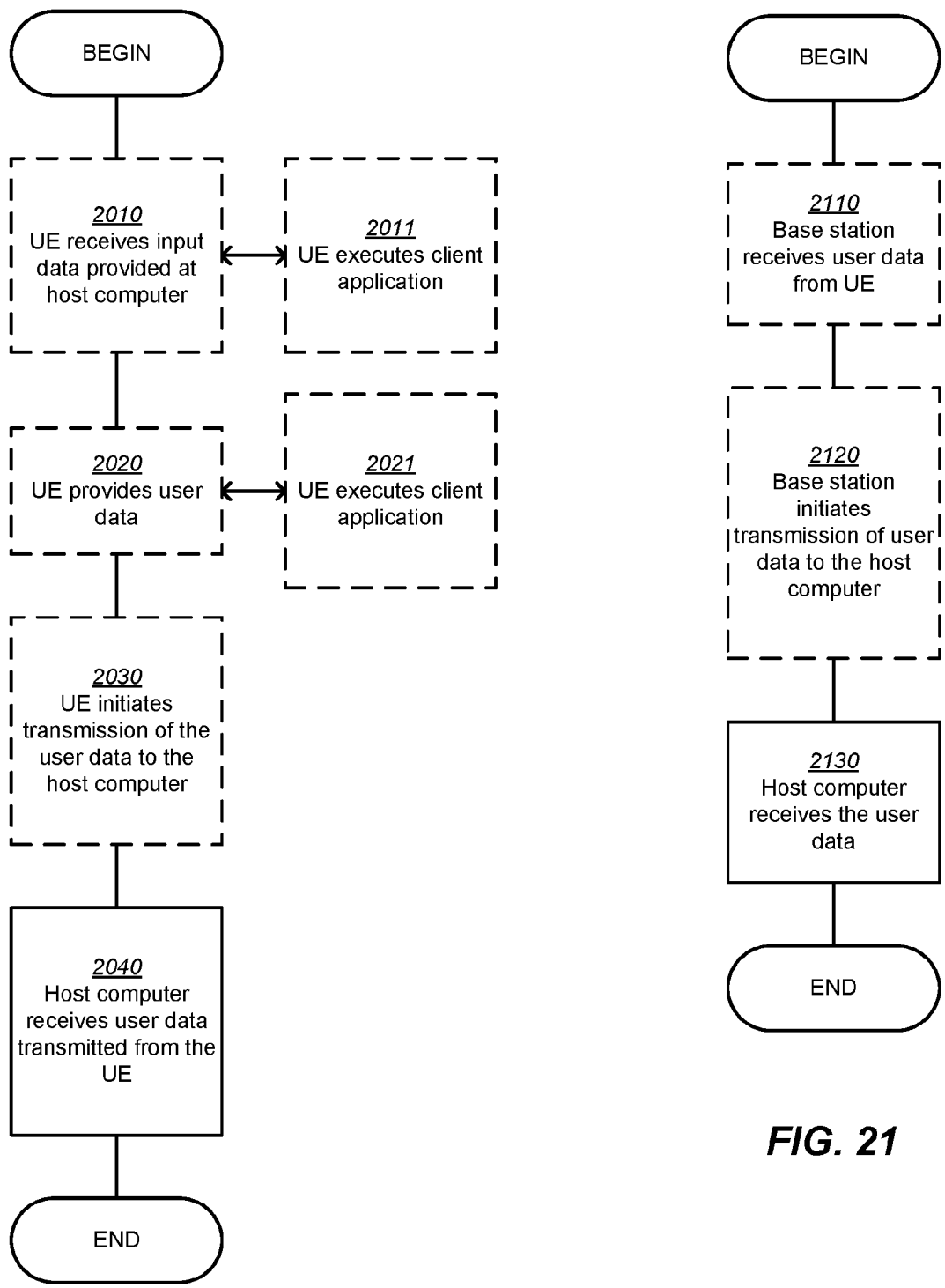
FIGS. 20 to 21 are flowcharts illustrating other example methods implemented in a communication system including a host computer, a base station and a user equipment.

FIG. 20 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 20 will be included in this section. In an optional first step 2010 of the method, the UE receives input data provided by the host computer. Additionally, or alternatively, in an optional second step 2020, the UE provides user data. In an optional substep 2021 of the second step 2020, the UE provides the user data by executing a client application. In a further optional substep 2011 of the first step 2010, the UE executes a client application which provides the user data in reaction to the received input data provided by the host computer. In providing the user data, the executed client application may further consider user input received from the user. Regardless of the specific manner in which the user data was provided, the UE initiates, in an optional third substep 2030, transmission of the user data to the host computer. In a fourth step 2040 of the method, the host computer receives the user data transmitted from the UE, in accordance with the teachings of the embodiments described throughout this disclosure.

FIG. 21 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 21 will be included in this section. In an optional first step 2110 of the method, in accordance with the teachings of the embodiments described throughout this disclosure, the base station receives user data from the UE. In an optional second step 2120, the base station initiates transmission of the received user data to the host computer. In a third step 2130, the host computer receives the user data carried in the transmission initiated by the base station.

Additional embodiments will be described to include aspects from FIGS. 16-21. According to some embodiments, a communication system including a host computer comprises processing circuitry configured to provide user data and a communication interface configured to forward the user data to a cellular network for transmission to a UE. The cellular network comprises a base station configured for synchronizing SFNs of wireless transmissions that use an NPBCH TTI that is divided into a plurality of blocks, each block comprising a plurality of radio frames and carrying a CSB version that is transmitted in a first subframe of each radio frame. The base station is configured to determine an FHCN identifying an FHC used when transmitting a NPBCH TTI, such that the FHCN may be used by a wireless device to identify SFNs for the NPBCH TTI, and transmit the FHCN to the UE. The communication system may include the base station and/or include the UE, where the UE is configured to communicate with the base station. The processing circuitry of the host computer may be configured to execute a host application, thereby providing the user data, and the UE may comprise processing circuitry configured to execute a client application associated with the host application.

According to some embodiments, a method implemented in a communication system including a host computer, a base station and a UE, comprises at the host computer, providing user data and initiating a transmission carrying the user data to the UE via a cellular network comprising the base station. The method is for synchronizing SFNs of wireless transmissions that use an NPBCH TTI that is divided into a plurality of blocks, each block comprising a plurality of radio frames and carrying a CSB version that is transmitted in a first subframe of each radio frame. The method at the base station comprises determining an FHCN identifying an FHC used when transmitting an NPBCH TTI, such that the FHCN may be used by a wireless device to identify SFNs for the NPBCH TTI, and transmitting the FHCN to the UE. The method at the base station may include transmitting the user data. The user data may be provided at the host computer by executing a host application, the method further comprising at the UE, executing a client application associated with the host application.

According to some embodiments, a communication system including a host computer comprises processing circuitry configured to provide user data and a communication interface configured to forward user data to a cellular network for synchronizing SFNs of wireless transmissions that use an NPBCH TTI that is divided into a plurality of blocks, each block comprising a plurality of radio frames and carrying a CSB version that is transmitted in a first subframe of each radio frame. The UE comprises a radio interface and processing circuitry, the UE's processing circuitry configured to receive an FHCN identifying an FHC used when transmitting an NPBCH TTI and identify SFNs for the NPBCH TTI based on the FHCN. The communication system may further include the UE, and the cellular network may further include a base station configured to communicate with the UE. The processing circuitry of the host computer may be configured to execute a host application, thereby providing the user data, and the UE's processing circuitry may be configured to execute a client application associated with the host application.

According to some embodiments, a method implemented in a communication system including a host computer, a base station and a UE, comprises at the host computer, providing user data and initiating a transmission carrying the user data to the UE via a cellular network comprising the base station. The method is for synchronizing SFNs of wireless transmissions that use NPBCH TTI that is divided into a plurality of blocks, each block comprising a plurality of radio frames and carrying a CSB version that is transmitted in a first subframe of each radio frame. The method at the UE comprises receiving an FHCN identifying an FHC used when transmitting an NPBCH TTI and identifying SFNs for the NPBCH TTI based on the FHCN. The method at the UE may comprise receiving the user data from the base station.

According to some embodiments, a communication system including a host computer comprises a communication interface configured to receive user data originating from a transmission from a UE to a base station, the UE's processing circuitry configured to synchronize SFNs of wireless transmissions that use an NPBCH TTI that is divided into a plurality of blocks, each block comprising a plurality of radio frames and carrying a CSB version that is transmitted in a first subframe of each radio frame. The UE's processing circuitry may be configured to receive an FHCN identifying an FHC used when transmitting an NPBCH TTI and identify SFNs for the NPBCH TTI based on the FHCN. The communication system may further include the UE and/or the base station, where the base station comprises a radio interface configured to communicate with the UE and a communication interface configured to forward to the host computer the user data carried by a transmission from the UE to the base station. The processing circuitry of the host computer may be configured to execute a host application, and the UE's processing circuitry may be configured to execute a client application associated with the host application, thereby providing the user data. The processing circuitry of the host computer may be configured to execute a host application, thereby providing request data, and the UE's processing circuitry may be configured to execute a client application associated with the host application, thereby providing the user data in response to the request data.

According to some embodiments, a method implemented in a UE for synchronizing SFNs of wireless transmissions that use an NPBCH TTI that is divided into a plurality of blocks, each block comprising a plurality of radio frames and carrying a CSB version that is transmitted in a first subframe of each radio frame, comprises receiving an FHCN identifying an FHC used when transmitting an NPBCH TTI and identifying SFNs for the NPBCH TTI based on the FHCN. The method may comprise providing user data and forwarding the user data to a host computer via the transmission to the base station.

According to some embodiments, a method implemented in a communication system including a host computer, a base station and a UE, comprises at the host computer, receiving user data transmitted to the base station from the UE, where the method is for synchronizing SFNs of wireless transmissions that use an NPBCH TTI that is divided into a plurality of blocks, each block comprising a plurality of radio frames and carrying a CSB version that is transmitted in a first subframe of each radio frame. The method at the UE comprises receiving an FHCN identifying an FHC used when transmitting an NPBCH TTI and identifying SFNs for the NPBCH TTI based on the FHCN. The method at the UE may comprise providing the user data to the base station. The method at the UE, may comprise executing a client application, thereby providing the user data to be transmitted, and at the host computer, executing a host application associated with the client application. The method at the UE may include executing a client application and receiving input data to the client application, the input data being provided at the host computer by executing a host application associated with the client application, where the user data to be transmitted is provided by the client application in response to the input data.

According to some embodiments, a communication system including a host computer comprising a communication interface configured to receive user data originating from a transmission from a UE to a base station configured for synchronizing SFNs of wireless transmissions that use an NPBCH TTI that is divided into a plurality of blocks, each block comprising a plurality of radio frames and carrying a CSB version that is transmitted in a first subframe of each radio frame, where the base station comprises a radio interface and processing circuitry. The base station's processing circuitry is configured to determine an FHCN identifying an FHC used when transmitting an NPBCH TTI, such that the FHCN may be used by the UE to identify SFNs for the NPBCH TTI and transmitting the FHCN to the UE. The communication system may further include the base station and/or the UE, where the UE is configured to communicate with the base station. The processing circuitry of the host computer may be configured to execute a host application, and the UE may be configured to execute a client application associated with the host application, thereby providing the user data to be received by the host computer.

According to some embodiments, a method implemented in a communication system including a host computer, a base station and a UE, comprises at the host computer, receiving, from the base station, user data originating from a transmission which the base station has received from the UE, where the method is for synchronizing SFNs of wireless transmissions that use an NPBCH TTI that is divided into a plurality of blocks, each block comprising a plurality of radio frames and carrying a CSB version that is transmitted in a first subframe of each radio frame and comprises. The method at the base station comprises determining an FHCN identifying an FHC used when transmitting an NPBCH TTI, such that the FHCN may be used by the UE to identify SFNs for the NPBCH TTI and transmitting the FHCN to the UE. The method at the base station may comprise receiving the user data from the UE. The method at the base station may comprise initiating a transmission of the received user data to the host computer. Similar embodiments may correspond to other methods described herein. All of these aspects described for FIGS. 16-21 may also be described with the techniques described for methods 500 and 800.

As discussed in detail above, the techniques described herein, e.g., as illustrated in the process flow diagrams of FIGS. 5, 6, 8 and 9, may be implemented, in whole or in part, using computer program instructions executed by one or more processors. It will be appreciated that a functional implementation of these techniques may be represented in terms of functional modules, where each functional module relates to a functional unit of software executing in an appropriate processor or to a functional digital hardware circuit, or some combination of both.

Figure 22:
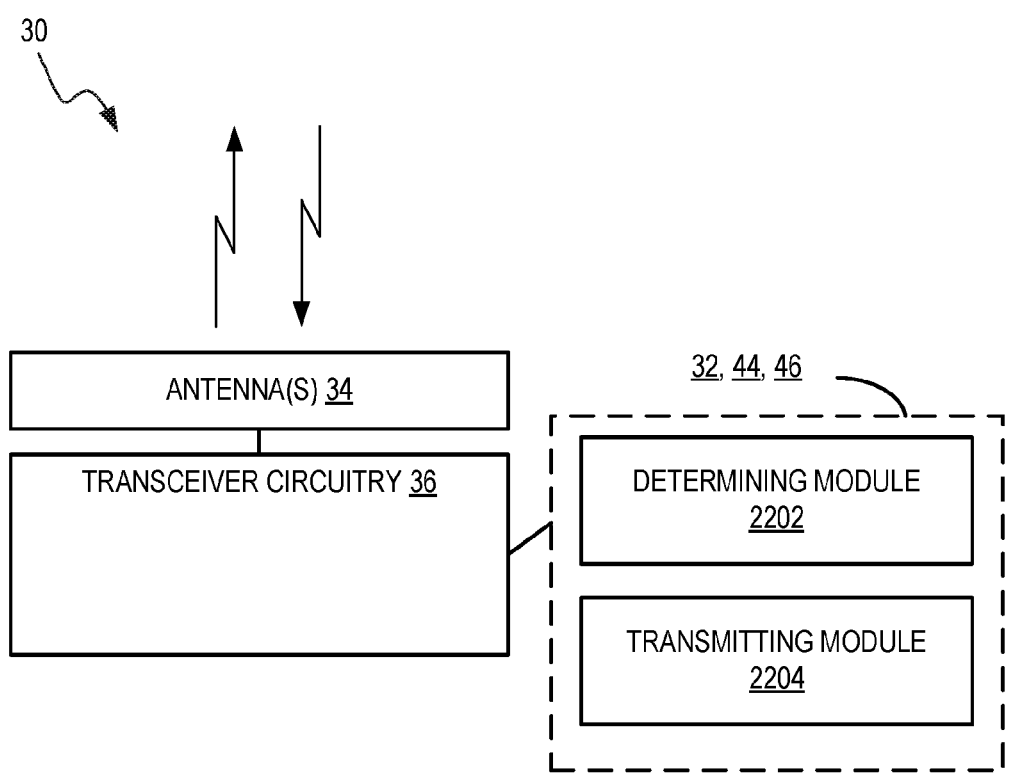
FIG. 22 is a block diagram illustrating a functional implementation of a network node for identifying SFNs for wireless transmissions, according to some embodiments.

FIG. 22 illustrates an example functional module or circuit architecture of a network node 30 for enabling a wireless device 50 to identify SFNs that are used for wireless transmissions that use a BCH TTI, where FHCs are not aligned with a cycle of the SFNs. The implementation includes a determining module 2202 for determining FH information indicating how the FHC used for wireless transmissions relates to the SFN cycle, such that a wireless device is able to use the FH information to identify an SFN timing for the wireless transmissions and a transmitting module 2204 for transmitting the FH information to a wireless device 50.

FIG. 22 may be used to illustrate another example functional module or circuit architecture for synchronizing SFNs of wireless transmissions that use an NPBCH TTI that is divided into a plurality of blocks, each block comprising a plurality of radio frames and carrying a CSB version that is transmitted in a first subframe of each radio frame, as may be implemented in a network node 30 of a wireless communication network. The functional implementation includes the determining module 2202 for determining an FHCN identifying an FHC used when transmitting an NPBCH TTI, such that the FHCN may be used by a wireless device to identify SFNs for the NPBCH TTI. The implementation also includes the transmitting module 2204 for transmitting the FHCN to a wireless device.

Figure 23:
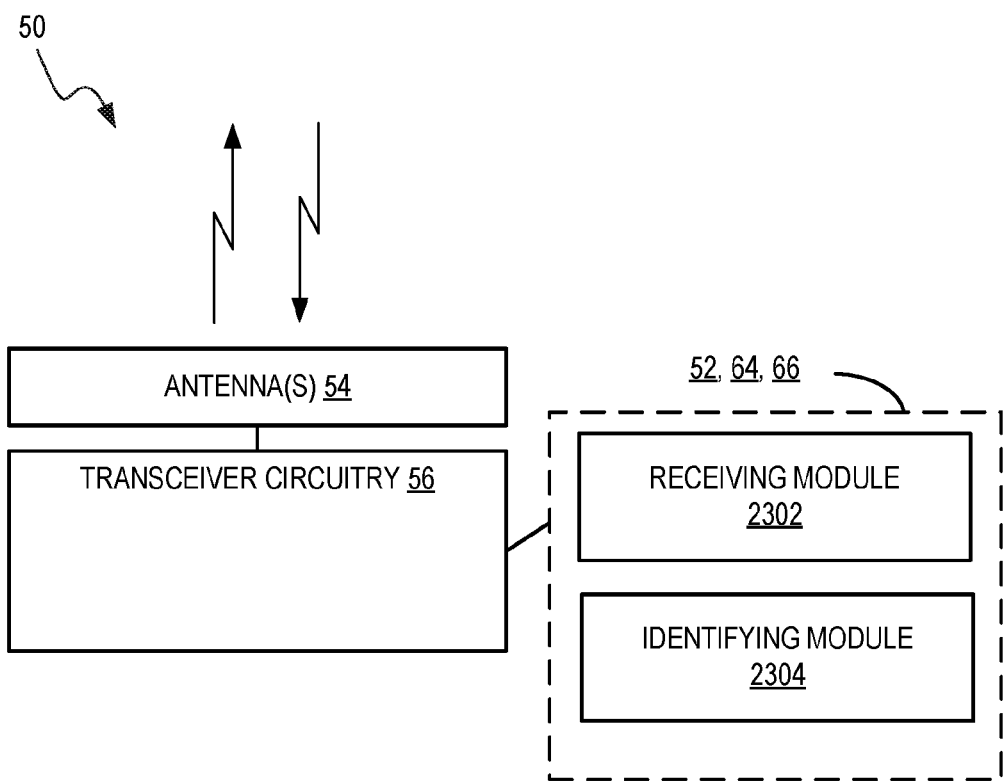
FIG. 23 is a block diagram illustrating a functional implementation of a wireless device for identifying SFNs for wireless transmissions, according to some embodiments.

FIG. 23 illustrates an example functional module or circuit architecture in a wireless device 50 for identifying SFNs that are used for wireless transmissions that use a BCH TTI, where FHCs are not aligned with a cycle of the SFNs. The implementation includes a receiving module 2302 for receiving FH information indicating how the FHC used for wireless transmissions relates to the SFN cycle and an identifying module 2304 for identifying an SFN timing for the wireless transmissions based on the FH information.

FIG. 23 may be used to illustrate another example functional module or circuit architecture for synchronizing SFNs of wireless transmissions that use an NPBCH TTI that is divided into a plurality of blocks, each block comprising a plurality of radio frames and carrying a CSB version that is transmitted in a first subframe of each radio frame, as may be implemented in a wireless device 50 operating in a wireless communication network. The implementation includes the receiving module 2302 for receiving an FHCN identifying an FHC used when transmitting an NPBCH TTI and the identifying module 2304 for identifying system frame numbers for the NPBCH TTI based on the FHCN.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts is to be determined by the broadest permissible interpretation of the present disclosure including the examples of embodiments and their equivalents, and shall not be restricted or limited by the foregoing detailed description.

The invention claimed is:

1. A method, in a wireless device, for identifying system frame number (SFNs) that are used for wireless transmissions that use a broadcast channel (BCH) transmission time interval (TTI) wherein frequency hopping (FH) cycles (FHCs) are not aligned with a cycle of the SFNs (SFN cycle), the method comprising:
  receiving FH information indicating how the FHC used for wireless transmissions relates to the SFN cycle; and
  identifying an SFN timing for the wireless transmissions based on the FH information according to:

$$SFN = (t_{hop} \cdot T_{dwell}/10) \bmod SFN\_cycle,$$

where $t_{hop}$=(FHCN·N), FHCN is an FHC number, $T_{dwell}$ is a dwell time for each frequency, and N is the number of hops in the FHC.

2. The method of claim 1, further comprising using the SFN timing to determine a specific frequency hop within the FHC.

3. The method of claim 1, wherein identifying the SFN timing comprises identifying the SFN timing based on a number of frequency hops in the FHC, a dwell time for each hopping frequency, and a number of the SFNs in the SFN cycle.

4. The method of claim 1, wherein receiving the FH information comprises receiving an FHCN identifying the FHC to be used, and wherein the SFN timing is based on the FHCN.

5. The method of claim 4, wherein the FHCN is determined by pseudo-randomly deriving the FHC from a physical cell identity (PCID) and/or a network identifier (NetID) associated with a network node.

6. The method of claim 1, wherein the wireless transmissions use a narrow band (NB) physical broadcast channel (NPBCH) TTI.

7. The method of claim 1, wherein the TTI is divided into a plurality of blocks, each block comprising a plurality of radio frames and carrying a code subblock (CSB) version that is transmitted in one or more subframes in one or more radio frames, wherein different CSB versions are used in successive blocks within the TTIs, and wherein identifying the SFN timing comprises using the CSB version to help identify a block, the SFN timing, and/or the FHC for the TTI.

8. The method of claim 7, further comprising, in response to using a CSB version to help identify the FHC, identifying the FHC with fewer bits than if the CSB version was not used, wherein the number of the fewer bits is based on a total number of CSB.

9. The method of claim 7, wherein the one or more subframes are one or more specific subframes within a radio frame or multiple consecutive subframes.

10. The method of claim 4, wherein the FHCN is received in a master information block (MIB).

11. The method of claim 10, wherein the MIB is acquired in one dwell of the FHC.

12. A wireless device configured for identifying system frame numbers (SFNs) that are used for wireless transmissions that use a broadcast channel (BCH) transmission time interval (TTI) wherein frequency hopping cycles (FHCs) are not aligned with a cycle of the SFNs (SFN cycle), the wireless device comprising:
transceiver circuitry configured for communicating with network nodes in a wireless communication network; and
processing circuitry operatively associated with the transceiver circuitry and configured to:
receive frequency hopping (FH) information indicating how the FHC used for wireless transmissions relates to the SFN cycle; and
identify an SFN timing for the wireless transmissions based on the FH information according to:

SFN=$(t_{hop} \cdot T_{dwell}/10)$mod SFN_cycle, where $t_{hop}$=(FHCN·N), FHCN is an FHC number, $T_{dwell}$ is a dwell time for each frequency, and N is the number of hops in the FHC.

13. The wireless device of claim 12, wherein the processing circuitry is configured to use the SFN timing to determine a specific frequency hop within the FHC.

14. The wireless device of claim 12, wherein the processing circuitry—is configured to identify the SFN timing by identifying the SFN timing based on a number of frequency hops in the FHC, a dwell time for each hopping frequency and the number of SFNs in the SFN cycle.

15. The wireless device of claim 12, wherein the processing circuitry is configured to receive the FH information by receiving an FHC number (FHCN) identifying the FHC to be used, and wherein the SFN timing is based on the FHCN.

16. The wireless device of claim 12, wherein the wireless transmissions use a narrow band physical broadcast channel (NPBCH) TTI.

17. The wireless device of claim 12, wherein the TTI is divided into a plurality of blocks, each block comprising a plurality of radio frames and carrying a code subblock (CSB) version that is transmitted in one or more subframes in one or more radio frames, wherein different CSB versions are used in successive blocks within the TTIs, and wherein the processing circuitry is configured to use the CSB version to help identify a block, the SFN timing, and/or the FHC for the TTI.

18. The wireless device of claim 17, wherein the processing circuitry—is configured to, in response to using a CSB version to help identify the FHC, identify the FHC with fewer bits than if the CSB version was not used, wherein the number of fewer bits is based on a total number of CSB.

19. The wireless device of claim 17, wherein the one or more subframes are one or more specific subframes within a radio frame or multiple subframes are consecutive subframes.

20. The wireless device of claim 12, wherein the FHCN is received in a master information block (MIB).

21. The wireless device of claim 20, wherein the MIB is acquired in one dwell of the FHC.

22. The wireless device of claim 15, wherein the FHCN is determined by pseudo-randomly deriving the FHC from a physical cell identity (PCID) and/or a network identifier (NetID) associated with the network node.

23. A non-transitory, computer-readable medium storing a computer program for identifying system frame numbers (SFNs) that are used for wireless transmissions that use a broadcast channel (BCH) transmission time interval (TTI) wherein frequency hopping (FH) cycles (FHCs) are not aligned with a cycle of the SFNs, the computer program comprising instructions that, when executed by a processing circuit of a wireless device—operating in a wireless communication network, cause the wireless device to:
receive FH information indicating how the FHC used for wireless transmissions relates to the SFN cycle; and
identify an SFN timing for the wireless transmissions based on the FH information according to:

SFN=$(t_{hop} \cdot T_{dwell}/10)$mod SFN_cycle, where $t_{hop}$=(FHCN·N), FHCN is an FHC number, $T_{dwell}$ is a dwell time for each frequency, and N is the number of hops in the FHC.

* * * * *